United States Patent
Filimonov et al.

(10) Patent No.: US 11,688,394 B1
(45) Date of Patent: Jun. 27, 2023

(54) ENTITY LANGUAGE MODELS FOR SPEECH PROCESSING

(71) Applicant: Amazon Technologies, Inc., Seattle, WA (US)

(72) Inventors: Denis Filimonov, Seattle, WA (US); Ravi Teja Gadde, Seattle, WA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 17/007,810

(22) Filed: Aug. 31, 2020

Related U.S. Application Data

(60) Provisional application No. 63/032,953, filed on Jun. 1, 2020.

(51) Int. Cl.
*G10L 15/187* (2013.01)
*G10L 15/16* (2006.01)
*G06N 3/049* (2023.01)
*G10L 15/02* (2006.01)

(52) U.S. Cl.
CPC ............ *G10L 15/187* (2013.01); *G06N 3/049* (2013.01); *G10L 15/16* (2013.01); *G10L 2015/025* (2013.01)

(58) Field of Classification Search
CPC ... G06N 3/049; G10L 15/16; G10L 2015/025; G10L 15/02; G10L 15/1815; G10L 15/26; G10L 15/183; G10L 15/18; G10L 25/30; G10L 15/08; G10L 2025/783; G10L 15/187; G10L 15/14; G10L 15/19; G10L 15/22; G10L 15/30; G10L 15/04; G10L 15/197

See application file for complete search history.

(56) References Cited

U.S. PATENT DOCUMENTS

| | | | |
|---|---|---|---|
| 9,047,868 B1 * | 6/2015 | O'Neill | G10L 15/197 |
| 9,305,554 B2 * | 4/2016 | Jagatheesan | G10L 15/30 |
| 9,412,370 B2 * | 8/2016 | Grobauer | G10L 15/183 |

(Continued)

OTHER PUBLICATIONS

Bahdanau, et al. "End-to-End Attention-Based Large Vocabulary Speech Recognition," arXiv:1508.04395v2 [cs.CL] Mar. 14, 2016.

(Continued)

*Primary Examiner* — Abdelali Serrou
(74) *Attorney, Agent, or Firm* — Pierce Atwood LLP

(57) ABSTRACT

This disclosure proposes systems and methods for leveraging entity-related language models in speech processing. A system can receive audio data corresponding to an utterance and perform automatic speech recognition (ASR) on a first portion of the audio data using a general language model. Based on the results, the system may identify a specific language model for processing a second portion of the audio data. The specific language model may include entities belonging to a common subject or class. The specific language model may, in some cases, provide better results than the general language model. While the general language model may describe a whole sentence, the specific language model may describe only a portion of a sentence. Thus, a top-level model may "activate" the specific language model when it may provide useful results. The resulting data may include results from both the general language model and the specific language model.

20 Claims, 22 Drawing Sheets

(56) References Cited

U.S. PATENT DOCUMENTS

| | | | | |
|---|---|---|---|---|
| 9,600,764 | B1* | 3/2017 | Rastrow | G06N 3/0445 |
| 9,972,339 | B1* | 5/2018 | Sundaram | G10L 25/30 |
| 10,121,467 | B1* | 11/2018 | Gandhe | G06F 40/247 |
| 10,134,421 | B1* | 11/2018 | Sundaram | G10L 25/30 |
| 10,140,981 | B1* | 11/2018 | Filimonov | G10L 15/183 |
| 10,152,298 | B1* | 12/2018 | Salvador | G06F 3/167 |
| 10,176,802 | B1* | 1/2019 | Ladhak | G10L 19/038 |
| 10,210,862 | B1* | 2/2019 | Ladhak | G10L 19/038 |
| 10,559,225 | B1* | 2/2020 | Tao | G10L 15/183 |
| 10,606,947 | B2* | 3/2020 | Lee | G10L 15/1815 |
| 11,282,522 | B2* | 3/2022 | Chae | G10L 15/16 |
| 2021/0256417 | A1* | 8/2021 | Kneller | G10L 15/22 |

OTHER PUBLICATIONS

Ma, et al. "Modeling Non-Linguistic Contextual Signals In LSTM Language Models Via Domain Adaptation," ICASSP 2018, pp. 6094-6098.

Wessel, et al. "A Comparison of Dialogue-State Dependent Language Models," ESCA Workshop on Interactive Dialogue in Multi-Modal Systems (IDS-99), Kloster Irsee, Germany, Jun. 22-25, 1999.

* cited by examiner

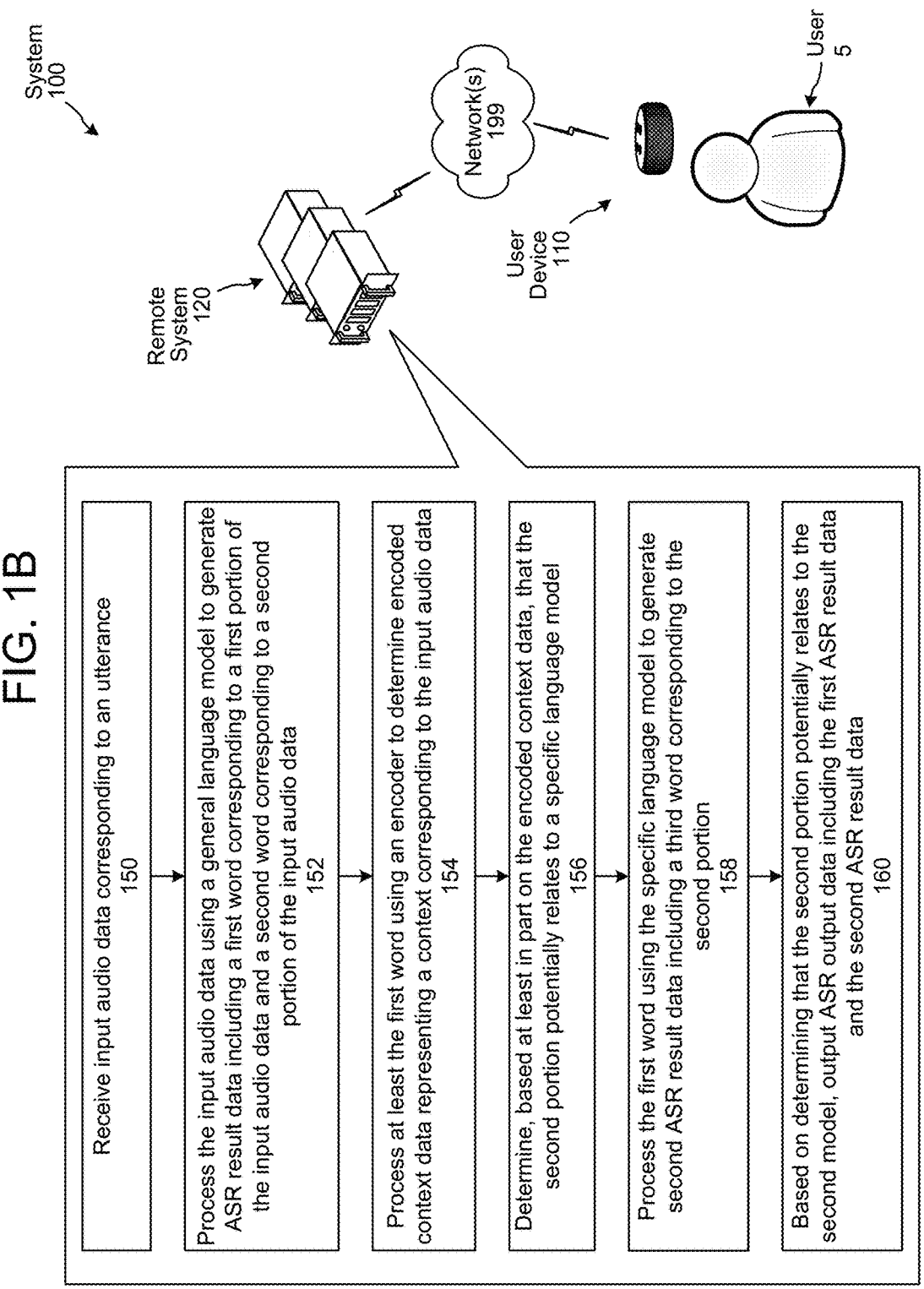

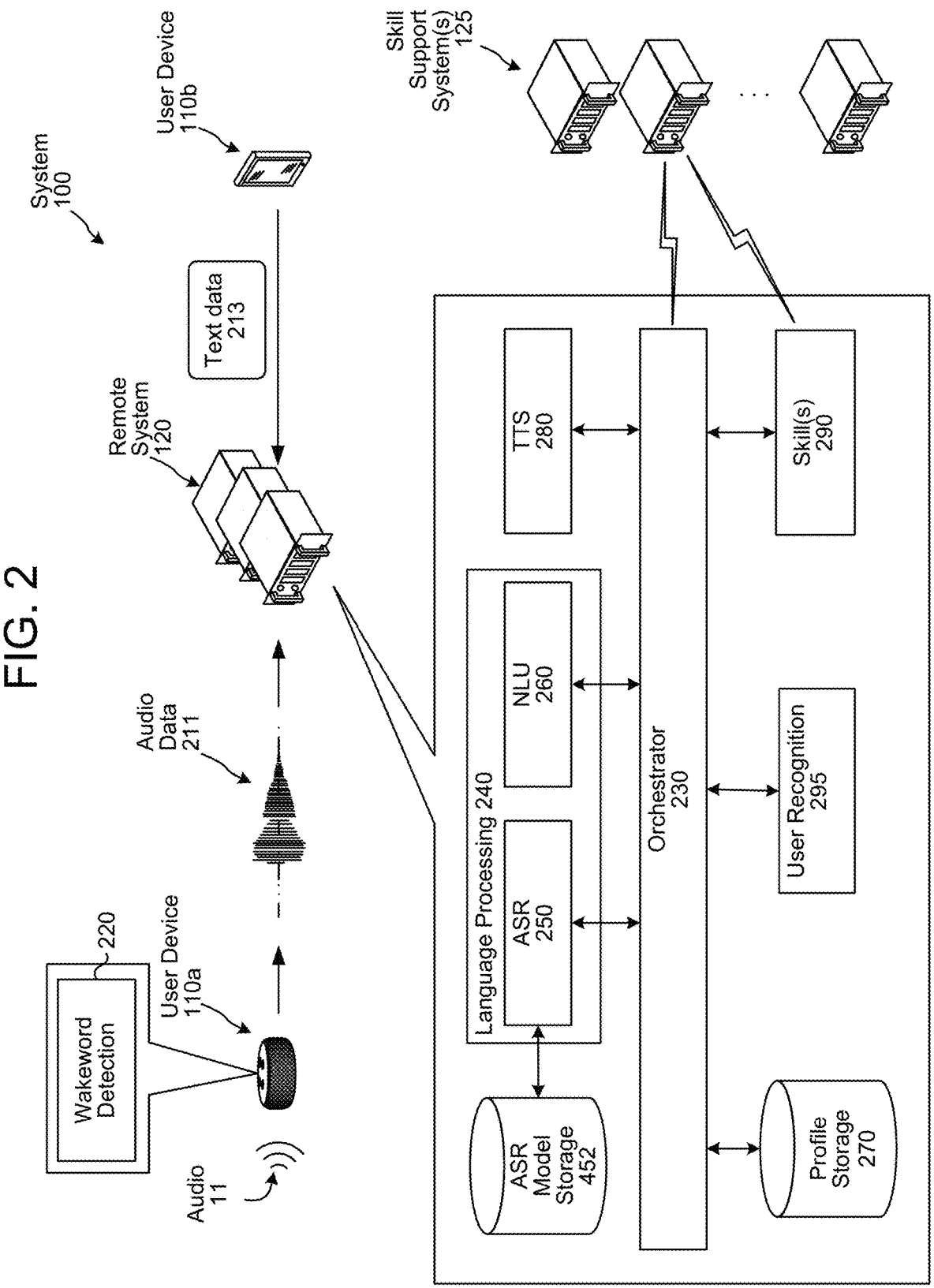

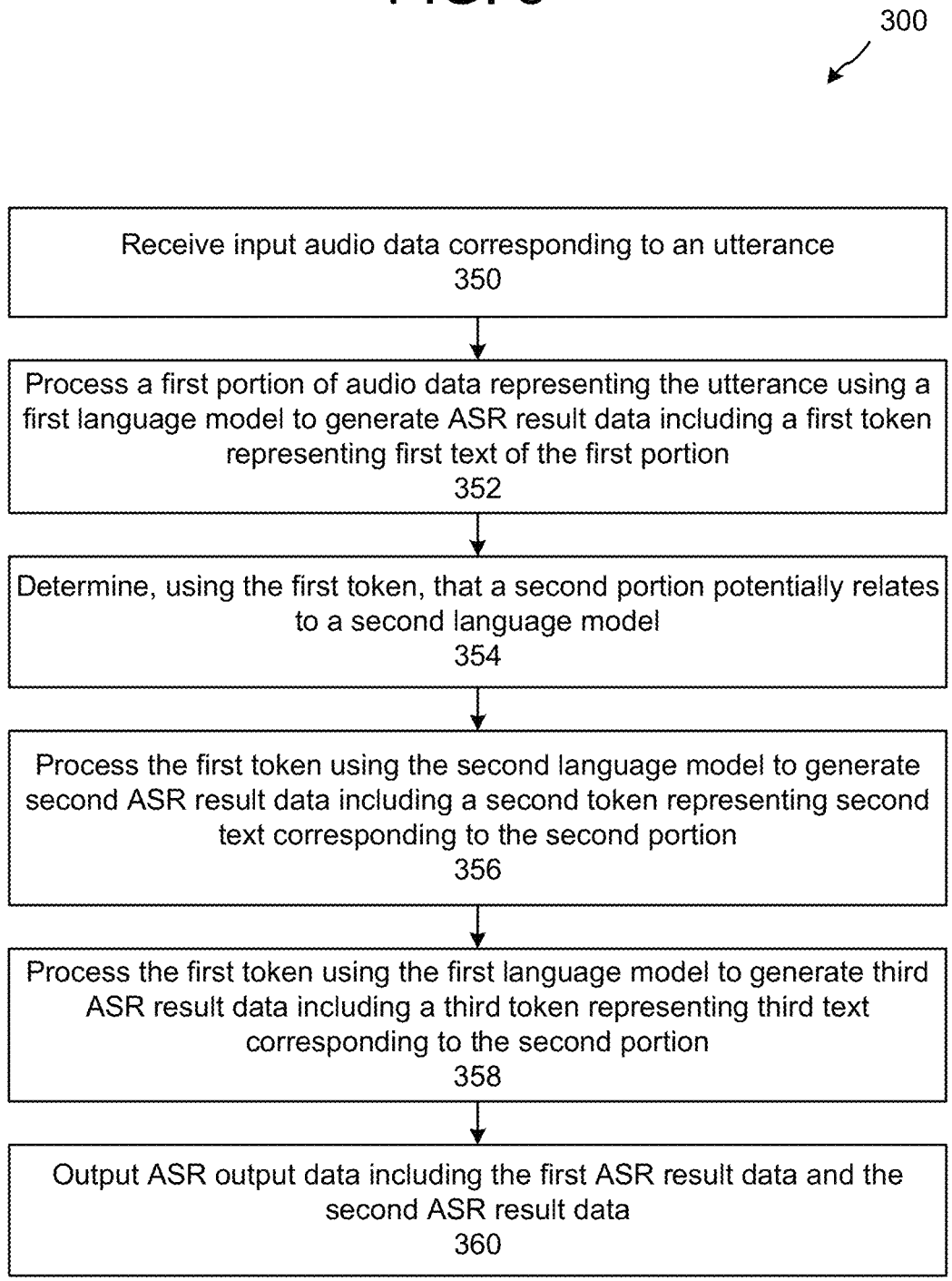

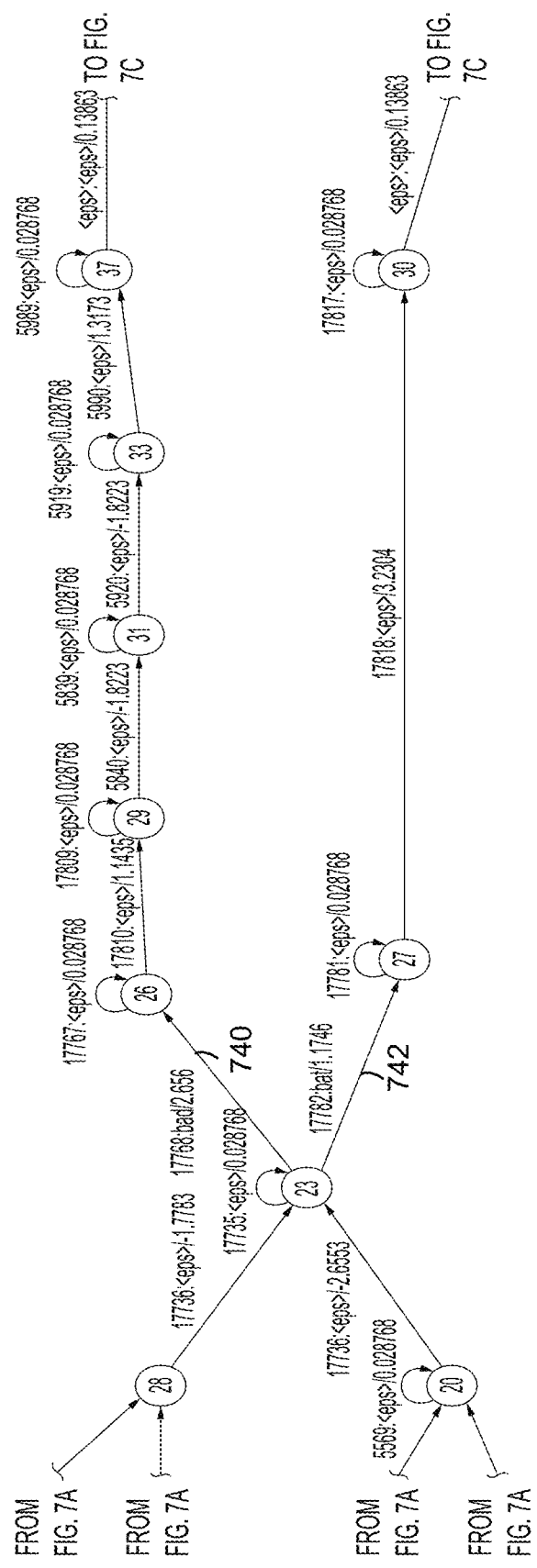

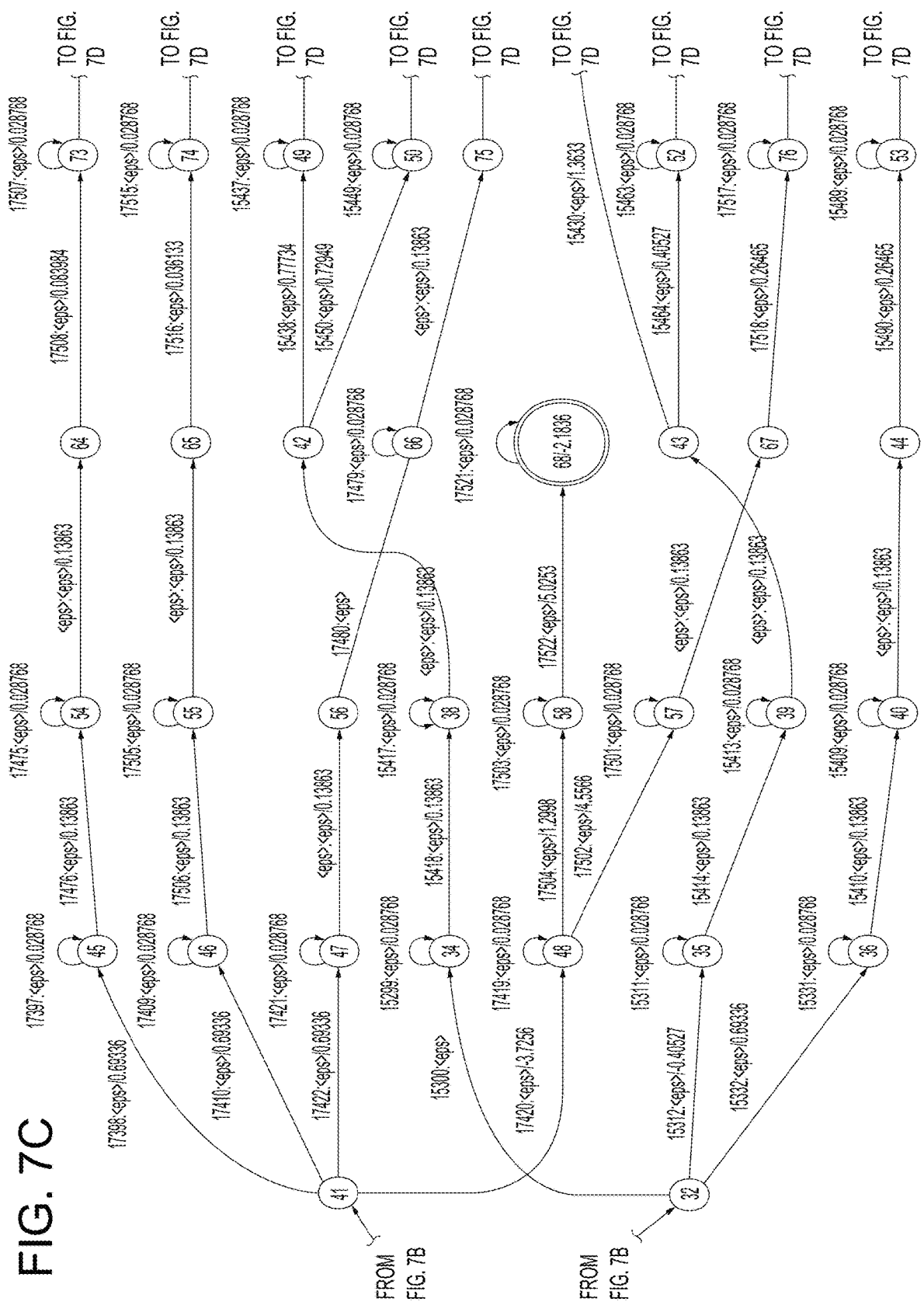

ENTITY LANGUAGE MODELS FOR SPEECH PROCESSING

CROSS REFERENCE TO RELATED APPLICATION

This application is a continuation of, and claims priority to, U.S. Patent Application No. 63/032,953 entitled "ENTITY LANGUAGE MODELS FOR SPEECH PROCESSING," filed on Jun. 1, 2020, in the names of, Denis Filimonov et al., the entirety of which is hereby incorporated by reference in its entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating a system configured to perform speech processing using entity language models, according to embodiments of the present disclosure.

FIG. 2 is a conceptual diagram of components of a remote system for speech processing, according to embodiments of the present disclosure.

FIG. 3 is a flowchart illustrating an example method of operation of a speech processing system using entity language models, according to embodiments of the present disclosure.

FIGS. 7A-7D illustrate a section of a finite state transducer according to embodiments of the present disclosure.

DETAILED DESCRIPTION

Figure 1A:
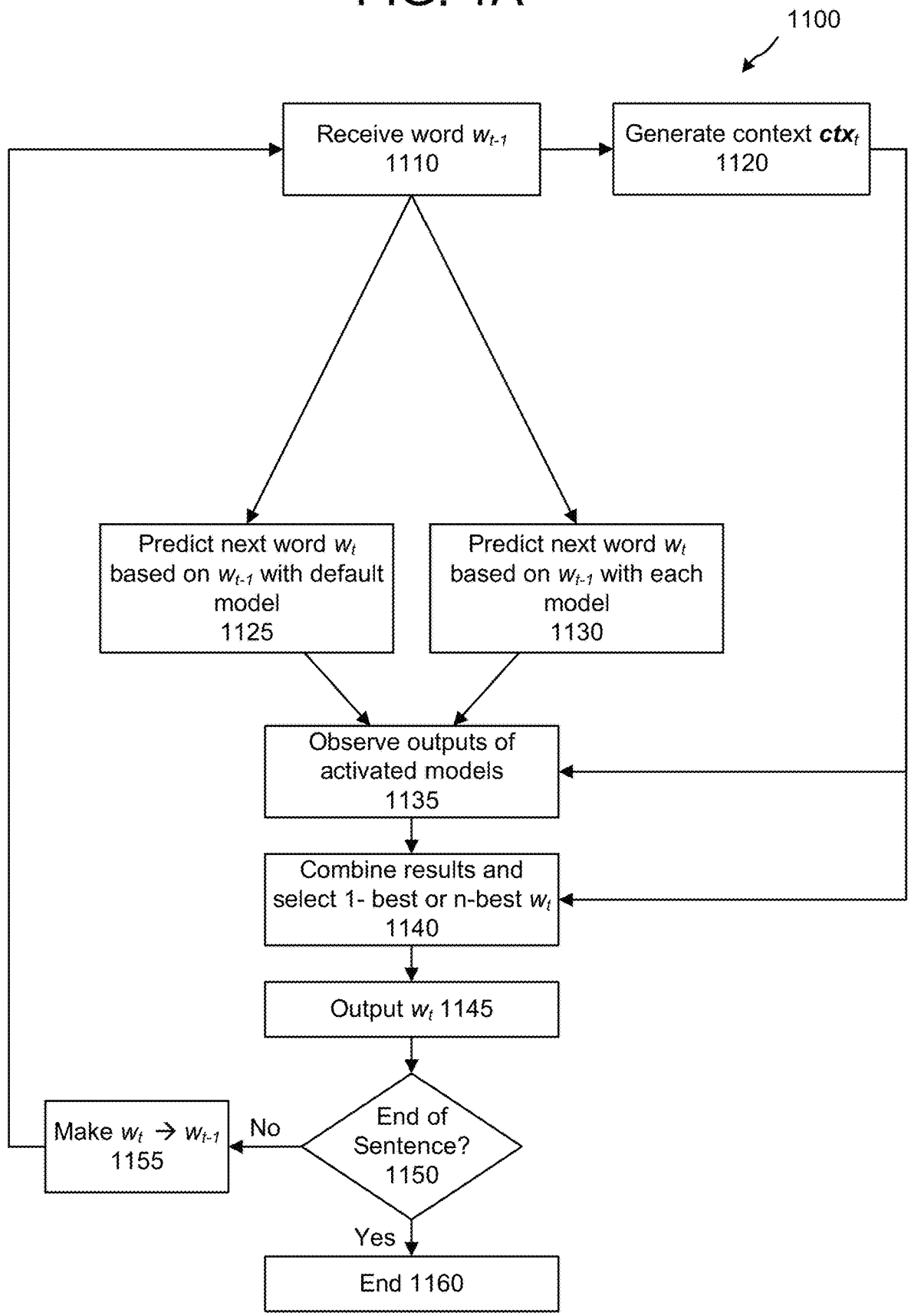
FIG. 1A is a flowchart illustrating an example method of operation of a speech processing system using the compositional language model, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a remote system. Text-to-speech (TTS) is a field of computer science concerning transforming textual and/or other data into audio data that is synthesized to resemble human speech.

A system may cause actions to be performed in response to natural language inputs (e.g., spoken inputs and text inputs, such as typed inputs). For example, for the natural language input "play Beethoven music," a system may output music composed by Beethoven. For further example, for the natural language input "turn on the lights," a system may turn on "smart" lights associated with a user's profile. In another example, for the natural language input "what is the weather," a system may output weather information for a geographic location corresponding to the user device that captured the natural language input. In the foregoing examples, actions correspond to the outputting of music, the turning on of "smart" lights, and the outputting of weather information. As such, as used herein, an "action" may refer to some result of a system's processing.

When a user provides a natural language input to a user device, the user device may generate a representation of the natural language input, and send the representation to a remote system (e.g., a cloud-based system) configured to perform language processing (as well as other processing described herein). For example, the remote system may perform ASR processing on audio data to generate ASR output data, and may perform NLU processing on ASR output data (or text corresponding to a typed natural language input) to generate NLU results data (e.g., representing a likely intent of the natural language input and corresponding slotted entities).

A remote system may implement (and/or be otherwise in communication with) one or more skill components. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like.

In at least some instances, a remote system may implement (and/or be otherwise in communication with) two or more skill components configured to process with respect to a same NLU intent (e.g., <OutputWeather>, <PlayMusic>, <PlayVideo>, <TurnOff> smart lights, <Lock> smart door lock, etc.), resulting in more than one skill component being capable of being invoked with respect to a single natural language input.

In some cases, when interacting with a particular skill (whether or not the user is aware of which skill she or he is interacting with), the user may use words and/or phrases that are unique to the skill, or unusual outside of the context of the particular skill, such as names of musicians, titles of books, customized commands, etc. For example, in some cases, the user may use names of contacts in his or her address book or of nearby locations. But because the user's speech is transcribed via ASR processing that happens before NLU identifying a relevant intent, entity, and/or skill, ASR processing typically uses a general language model to convert the speech to text. Accuracy of ASR predictions may be improved as compared to using a general language model when transcribing words and/or phrases specific to a particular topic (such as a particular skill or the like). The ASR predictions can be improved by including language models that can more accurately predict topic-specific words or phrases; for example, customized entity models that include words and/or names particular to a topic, skill, user, etc. Doing so, however, presents additional technical challenges. In particular, while a general language model represents entire sentences, a topic-specific model, such as a topic-specific entity model, may represent only a portion of a sentence. Thus, a top-level model may be trained using example utterances with manual annotations indicating where the entity models may be useful in a sentence. But providing manually annotated examples can be relatively more expensive, time consuming, and/or in some cases put burdens on skill developers, who may represent an organization other than the one providing the ASR system.

This disclosure therefore describes systems and methods for using a compositional language model to activate topic specific models, such as entity models. Although various topic specific models may be used according to the techniques and operations discussed herein, the descriptions below focus on the use of entity model(s) for ease of illustration. Though the descriptions may equally apply for other topic specific models such as models designed to recognize customized commands, intents, etc. The compositional language model may be trained with unannotated data representing utterances from examples of use of a speech processing system, thereby reducing reliance on manually annotated training data. The compositional model may include, or supplement, a general language model trained to model language broadly; that is, for whole sentences spanning various topics, users, and contexts. The compositional language model may activate relevant entity models (e.g., use an entity model during portions of ASR processing), and determine when an entity model may produce a better ASR result than the general language model for a portion of a sentence that may, for example, pertain to a particular topic, skill, user, etc.

In an example operation, the system processes input audio data using an acoustic model to generate a sequence of acoustic units, such as phonemes, that represent sounds in the input audio data. At least initially, a default model such as a general language model may transcribe the acoustic units into words (or subwords or phrases, etc.). If a given word or string of words suggests that an entity model may yield better predictions of a subsequent word or words, an "activation" component of the compositional model may activate the entity model in addition to the default model to process subsequent acoustic units. For example, based on a word or words previously transcribed, the system may activate an entity model for purposes of processing a certain portion of the input data. The compositional model may combine the output of the default model and any specific language models such that the ASR output data may include words generated by either or both of the default model or specific model. The entity model may remain activated until it (or some other component) determines a likelihood that there are no more words, subwords, or phrases likely to follow the preceding sequence of words, thus outputting an end of sentence/phrase indicator such as </s>. In some cases, the compositional language model (or other component) may activate more than one entity model depending on the activation signals generated for a given sequence of words. In some implementations, some or all of the specific language models may continuously process input data, but the compositional model may ignore the output of a specific language model unless/until it is activated. When a specific language model is activated, the compositional model may combine the results of the default model and any activated specific language models. An "attention" component may look at the words yielded by the default model and any entity models activated, and determine which output or outputs are associated with the highest probabilities. The attention component may take as an input the same or similar context signal as used by the activation component, and use the context signal to weight the probabilities output by the models. Thus, activation may be computed independently for each entity model, while attention is normalized across all models. The output of the compositional model may include the 1-best or n-best ASR hypotheses generated by the default language model and activated specific language models.

A system according to the present disclosure may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a flowchart illustrating an example method 1100 of operation of a speech processing system using the compositional language model, according to embodiments of the present disclosure. The method 1100 can be performed, for example, by a remote system 120 running a compositional language model 1000 as described further below. The method 1100 starts by receiving (1110) a word $w_{t-1}$. Based on the word $w_{t-1}$, the method can generate (1120) a context vector $ctx_t$. A default model may predict (1125) a next word $w_t$ based on the received word $w_{t-1}$. In addition, one or more entity models may predict (1130) a next word $w_t$ based on the received word $w_{t-1}$. The method 1100 may, based on the context vector $ctx_t$, "activate" one or more of the entity models and observe (1135) their outputs. An attention component may receive the predictions from the default model and the activated entity models, and may additionally receive the context vector $ctx_t$. The attention component may combine (1140) the results from the models and weight them based on the context vector $ctx_t$, and select a best predicted $w_t$ or an n-best list of predicted $w_t$. The compositional language model 1000 may output (1145) the next word $w_t$. If the compositional language model 1000 detects (yes at a decision block 1150) an end-of-sentence indication (e.g., </s>), the method 1100 may end (1160). If the compositional language model 1000 does not detect (no at the decision block 1150) an end-of-sentence indication, the compositional language model 1000 may make (1155) the resulting word $w_t$ the next previous word $w_{t-1}$ for returning to the step 1110 and repeating steps 1110 through 1150. The method 1100 may repeat as necessary, and provide a transcription of the input audio data for downstream processes such as NLU, entity resolution, and skill/speechlet. Although the method 1100 is illustrated with certain steps in a particular order, the steps described may be performed in a different order (as well as certain steps removed or added) without departing from the present disclosure.

FIG. 1B is a conceptual diagram illustrating a system 100 configured to perform speech processing using entity language models, according to embodiments of the present disclosure. As shown in FIG. 1B, the system 100 may include a user device 110 (local to a user 5) and a remote system 120 connected across one or more networks 199. While the user 5 is illustrated as being a human, other types of users (e.g., computing systems) may exist. The device 110 may be capable of receiving audio and/or video input, and providing audio and/or video output. The device may be a voice-enabled device. The device 110 may receive audio corresponding to a spoken natural language input originating from the user 5. The device 110 may record audio following detection of a wakeword. The device 110 may generate audio data corresponding to the audio, and may send the audio data to the remote system 120. The device 110 may send the audio data to the remote system 120 via an application that is installed on the device 110 and associated with the remote system 120. An example of such an application is the Amazon Alexa application that may be installed on a smart phone, tablet, or the like. In some implementations, the device 110 may receive text data corresponding to a natural language input originating from the user 5, and send the text data to the remote system 120. The device 110 may also receive output data from the remote system 120, and generate a spoken-word audio output. In some implementations, some or all of the natural language processing operations described below may be performed on the device 110 instead of or in addition to the system 100. Examples of various devices 110 are further illustrated in FIG. 18.

The following describes example operations for speech processing using entity language models. The system 100 can receive input audio data corresponding to an utterance (150). The system 100 can process the input audio data using a general language model to generate automatic speech recognition (ASR) result data including a first word corresponding to a first portion of the input audio data and a second word corresponding to a second portion of the input audio data (152). The system 100 can process at least the first word using an encoder to determine encoded context data representing a context corresponding to the input audio data (154). The system 100 can determine, based at least in part on the encoded context data, that the second portion potentially relates to a specific language model (156). The system 100 can process the first word using the specific language model to generate second ASR result data including a third word corresponding to the second portion (158). The system 100 can output ASR output data including the first ASR result data the second ASR result data (160).

The system 100 can receive input audio data corresponding to an utterance (150). The input audio data can represent, for example, a command spoken by the user 5 to the device 110. Having received the spoken command, the device 110 may transmit the input audio data to the remote system 120. An ASR component of the remote system 120 may process the input audio data using acoustic model to generate a sequence of phonemes representing sounds of the input audio data as they relate to spoken language. The ASR component may process the sequence of phonemes using one or more language models to generate a textual transcription of the utterance. Additionally, the language models may predict words likely to follow one or more preceding words. The ASR component may output ASR result data, which may include a textual transcription of the input audio data; or, in some cases, one or more hypotheses, where each hypothesis includes a possible textual transcription of the utterance and a confidence score indicating a likelihood that the transcription is an accurate representation of the utterance. The ASR process is described in additional detail below.

The system 100 can process the input audio data using a general language model to generate first ASR result data including a first word corresponding to a first portion of the input audio data and a second word corresponding to a second portion of the input audio data (152). The general language model may predict a word based on one or more preceding words. The prediction may be based on an observation that, in a corpus of data used to train the general language model, a given word or words used in speech may be followed by one of more successive words with respective probabilities. For some portions of some utterances, ASR may benefit from applying user-, context-, and/or domain-specific language model. A specific language model may improve the transcriptions of the ASR component, particularly with regard to words and/or phrases unusual in ordinary speech, but perhaps more common in speech related to a particular topic; for example, movie titles. Typically, however, intent/domain information has not yet been determined at the ASR stage, so the system 100 may incorporate a compositional model that may determine which specific library or libraries to invoke based on a word or word recognized in the speech. The compositional model may "activate" one or more specific language models based on a context determined based on preceding words.

The system 100 can process at least the first word using an encoder to determine encoded context data representing a context corresponding to the input audio data (154). The encoder can process the first word and possibly one or more words preceding the first word to generate the encoded context data. The encoded context data can be, for example, a vector that represents a quantitative representation of the first word and any other words encoded. In some implementations, the encoded context data may be a fixed-size vector that may be suitable for input into a trained model such as a long short-term memory (LSTM) network. The system 100 can use the encoded context data to identify one or more specific language models that may be helpful for processing subsequent words of the input audio data. The context encoder is discussed in further detail below with reference to FIG. 10.

The system 100 can determine, based at least in part on the encoded context data, that the second portion potentially relates to a specific language model (156). Certain words or phrases may indicate that a following word or phrase may belong to a certain category such as an entity class, where a class includes a group of entities related by topic, context, or subject such as locations, movie titles, proper names of individuals in a user's contact list, etc. For example, an entity class may correspond to entity names associated with a particular gazetteer (such as 1384 discussed below). For example, the word "at" may precede an entity type location, the phrase "show times for" may precede an entity type movie title, and the word "call" may precede an entity type name, etc. Thus, the system 100 may use the encoded context data to identify a specific language model (and, in some cases, multiple specific language models) that may be useful for predicting a subsequent word. The specific language model may be an entity model specific to a particular entity class. The entity model may include a list of entities belonging to the class. The entity data may also include entity data (referred to herein as a model embedding) that includes information that the system 100 can use to determine when the entity model may be relevant to the received speech. In some implementations, the entity data may be a fixed-size learnable vector. Thus, in some implementations, the system 10 may calculate an activation value based on processing the encoded context vector and the entity data vector. The activation value may be a probability. If the system 100 determines that the activation value of an entity model satisfies a condition, the system 100 may "activate" that entity model. For example, the system 100 may determine that the activation value meets or exceeds a threshold, is below a threshold, falls within a particular range, or is a particular value (e.g., 1). Entity model activation is discussed in further detail below with reference to FIGS. 10 and 11.

The system 100 can process the first word using the specific language model to generate second ASR result data including a third word corresponding to the second portion (158). The system 100 can use the specific language model to predict the third word based on the first word and, in some cases, additionally based on one or more words preceding the first word. The system 100 can combine the outputs of the multiple language models as respective ASR hypotheses. The second portion of the input audio data may relate to the topic of the specific language model, so the specific language model may provide a better prediction of the word represented in the second portion. Thus, the system 100 may use the first ASR result data determined at the step 152 as a baseline; that is, the second ASR result data produced by the specific language model may be useful if it represents a better prediction of a word representing the second portion than the first ASR result data produced by the general language model. ASR result data may include a probability associated with a predicted word. The system 100 can use the probabilities associated with the first ASR result data and the second ASR data to determine which result to include in the ASR output data; or, how to rank the respective ASR result data—e.g., as competing hypotheses—in the ASR output data. In determining which ASR result data represents the best prediction of the second word, the system 100 may take into account other data. For example, the system 100 may take into account the encoded context data, determined during the step 154, to weight the word probabilities output by the various models. The process of receiving and weighting ASR result data from the various language models is referred to as "attention," which is discussed in further detail below with reference to FIGS. 10 and 11.

The system 100 can output ASR output data including the first ASR result data and the second ASR result data (160). The system 100 can provide the ASR result data to downstream processes such as NLU and skills/speechlets. The system 100 may feedback the ASR result data into the language model(s) for determining subsequent words. For example, the system 100 may repeating some or all of the steps 152-160 using the first, second, and/or third word to determine a fourth word corresponding to a third portion of the input audio data.

In some cases, the specific language model may only describe a portion of a sentence; for example, a proper noun. (This in contrast to the general language model, which may describe a whole sentence.) Thus, at some point during ASR processing of the input audio data, it may be desirable to "deactivate" the specific language model when it is unlikely to yield additional useful data for transcribing the utterance. The specific language model may, for a given input word or words, output ASR result data including an end indicator "</s>" representing an end of a word sequence. The end indicator may be accompanied by a probability value indicating a confidence that the specific language model has likely reached the end of the word, word sequence, phrase, clause, name, etc. that it has predicted. Based on the end indicator and the probability value, the system 100 may determine that the specific language model is unlikely to continue determining useful ASR result data during this activation. The system 100 may deactivate the specific language model, that is, ignore its output, until such time as the system 100 determines that a subsequent portion of the input audio data potentially relates to the specific language model.

FIG. 2 is a conceptual diagram of components of the remote system 120, according to embodiments of the present disclosure. The system 100 may operate using various components as illustrated in FIG. 2. The various components may be located on a same or different physical devices. Communication between various components may occur directly or across a network(s) 199.

An audio capture component(s), such as a microphone or array of microphones of a user device 110a, captures audio 11. The user device 110a processes audio data, representing the audio 11, to determine whether speech is detected. The user device 110a may use various techniques to determine whether audio data includes speech. In some examples, the user device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110a may implement a limited classifier configured to distinguish speech from background noise. The classifier may be implemented by techniques such as linear classifiers, support vector machines, and decision trees. In still other examples, the user device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the user device 110a may use a wakeword detection component 220 to perform wakeword detection to determine when the user 5 intends to speak an input to the remote system 120. The user device 110a may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the user device 110a may "wake" and begin transmitting audio data 211, representing the audio 11, to the remote system 120. The audio data 211 may include data corresponding to the detected wakeword, or the user device 110a may remove the portion of the audio corresponding to the detected wakeword prior to sending the audio data 211 to the remote system 120.

The remote system 120 may include an orchestrator component 230 configured to receive the audio data 211 from the user device 110a and relay data to and from the various components of the remote system 120. The remote system 120 may include a language processing component 240 configured to perform language processing. As used herein, language processing may refer to NLU processing, or a combination of ASR processing and NLU processing. In some implementations, functions of the language processing component 240 may be split between the remote system 120 and the user device 110a. That is, the user device 110a may have natural language processing capabilities of its own, such as ASR and/or NLU components similar to those of the language processing component 240. Whether natural language processing is performed on the user device 110a, the remote system 120, or split between the user device 110a and remote system 120 in a hybrid configuration, the operations discussed below remain the same.

The orchestrator component 230 may send the audio data 211 to an ASR component 250 that transcribes the audio data 211 into ASR results data including one or more ASR hypotheses. ASR results data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. In doing so, the ASR component 250 may refer to an ASR model storage 452, which can include one or more acoustic models, language models, finite state transducers (FSTs), etc., which can be used for transcribing the audio data 211. Further details about how the ASR component 250 may perform speech processing are found below.

In addition to a user device 110a receiving a spoken natural language input, a user device 110b may receive a typed natural language input. The user device 110b may generate text data 213 representing the typed natural language input, and may send the text data 213 to the remote system 120, wherein the text data 213 is received by the orchestrator component 230.

Figure 12:
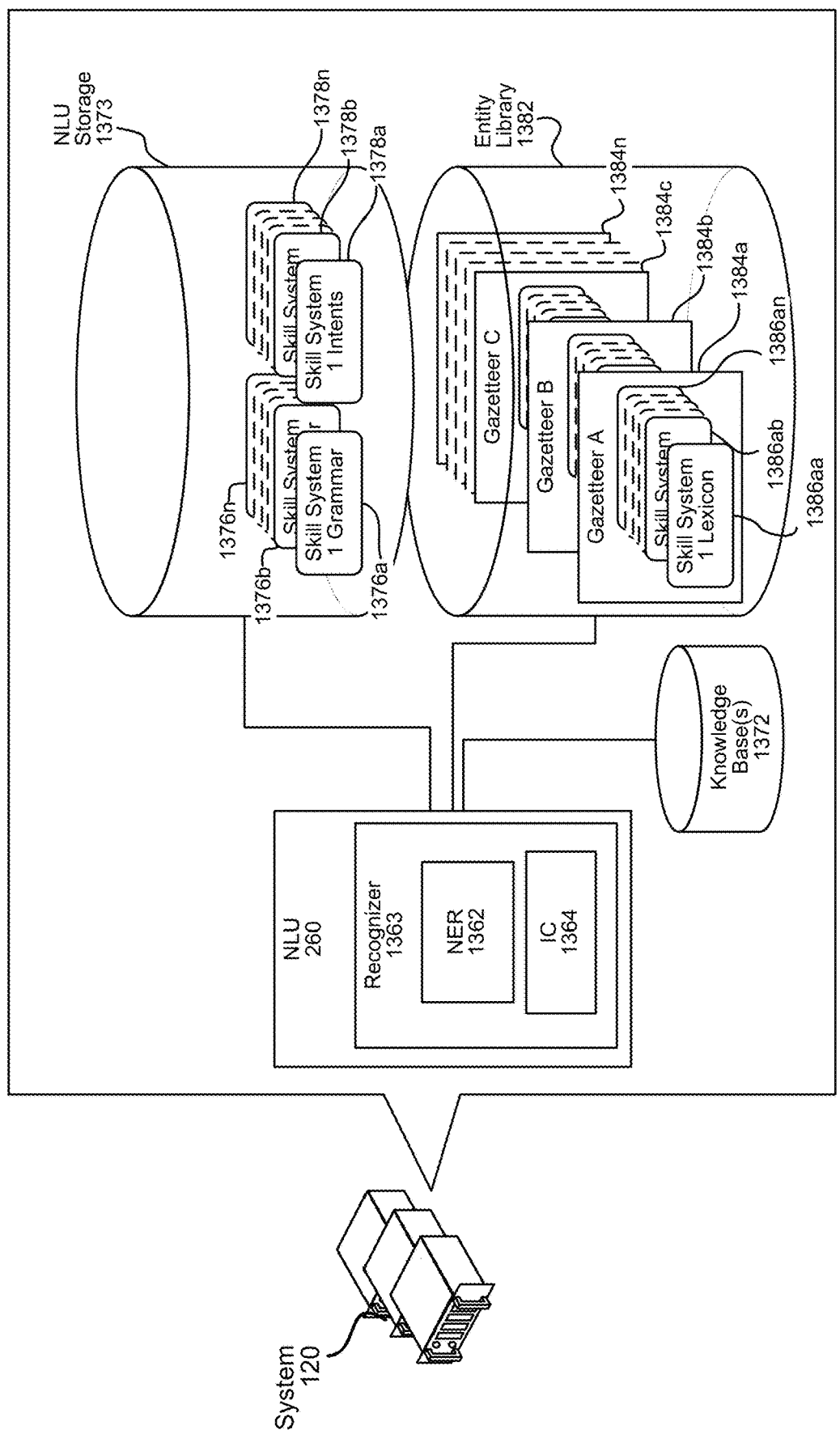
FIG. 12 is a conceptual diagram of how natural language processing is performed, according to embodiments of the present disclosure.
Figure 13:
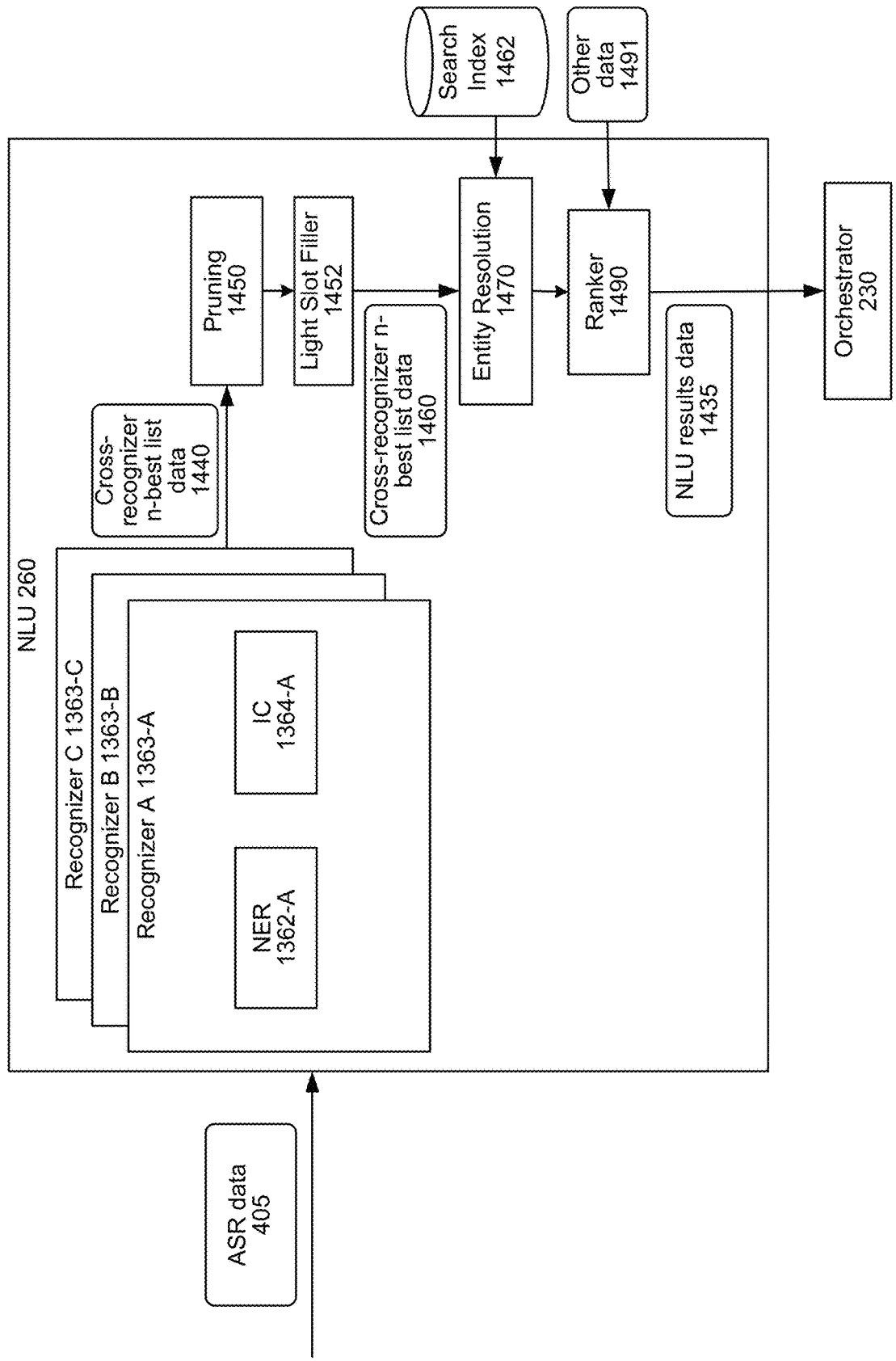
FIG. 13 is a conceptual diagram of how natural language processing is performed, according to embodiments of the present disclosure.

The orchestrator component 230 may send the text data 213 or ASR results data output by the ASR component 250, depending on the type of natural language input, to a NLU component 260. FIGS. 12 and 13, described further below, illustrates how the NLU component 260 may perform NLU processing.

The remote system 120 may include or otherwise communicate with one or more skill components 290 and/or skill support systems 125. A skill component 290 may be configured to execute with respect to NLU results data 485. For example, for NLU results data 485 including a <GetWeather> intent, the remote system 120 (and more particularly the orchestrator component 230) may invoke a weather skill component 290 to determine and output weather information for a geographic location represented in a user profile or corresponding to a location of the user device 110 that captured the corresponding natural language input. For further example, for NLU results data including a <BookRide> intent, the remote system 120 (and more particularly the orchestrator component 230) may invoke a taxi skill component 290 may book a requested ride. In another example, for NLU results data including a <BuyPizza> intent, the remote system 120 (and more particularly the orchestrator component 230) may invoke a restaurant skill component 290 may place an order for a pizza. A skill component 290 may operate in conjunction between the remote system 120 and other devices, such as the user device 110, restaurant electronic ordering systems, taxi electronic booking systems, etc. in order to complete certain functions. Inputs to a skill component 290 may come from speech processing interactions or through other interactions or input sources. A skill may be implemented as a skill component 290 and/or a skill support system 125 separate from the remote system 120.

A skill component 290 may be associated with a domain, a non-limiting list of which includes a smart home domain, a music domain, a video domain, a weather domain, a communications domain, a flash briefing domain, a shopping domain, and a custom domain.

Figure 10:
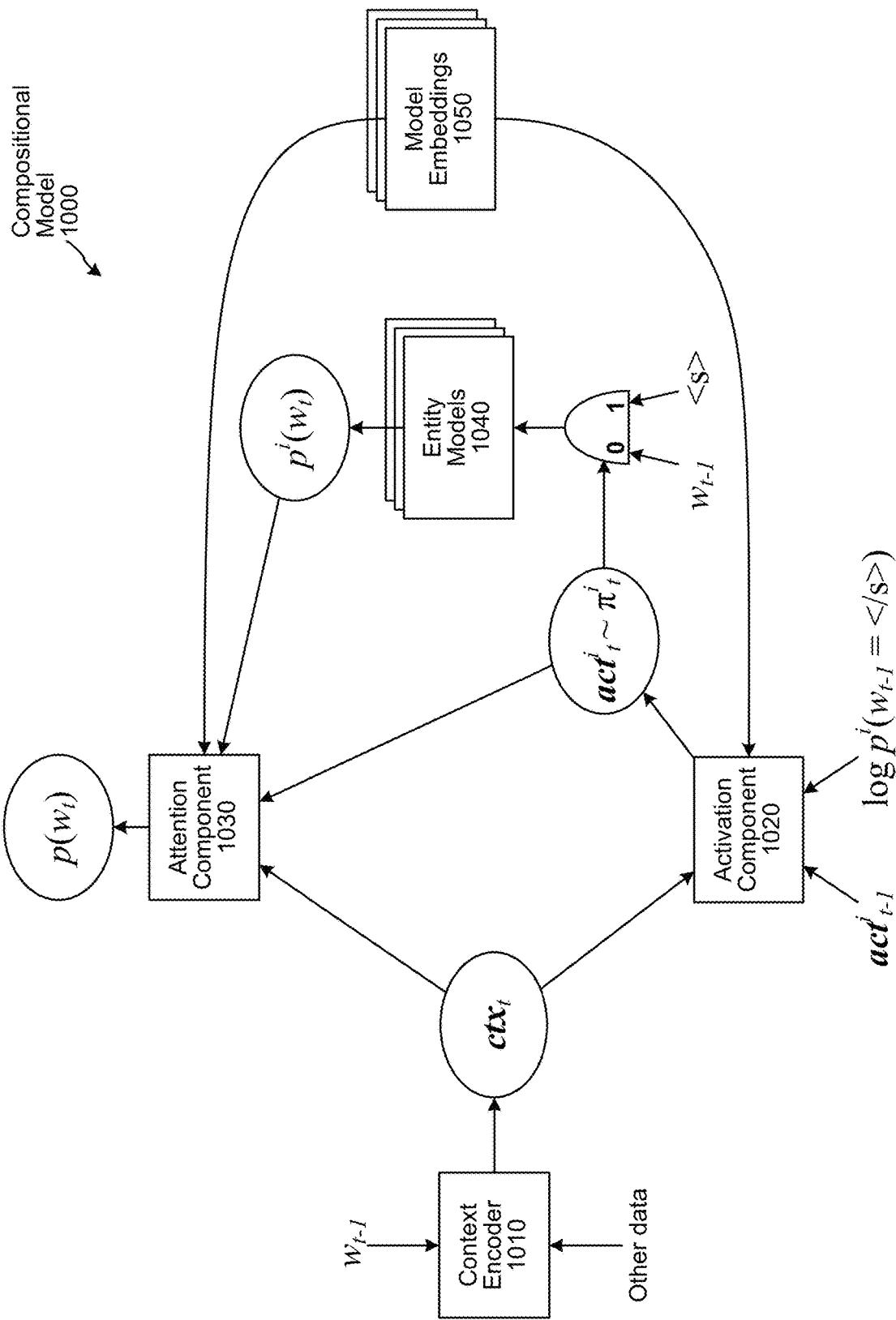
FIG. 10 is a conceptual diagram of components of a compositional language model of a speech processing system, according to embodiments of the present disclosure.
Figure 11:
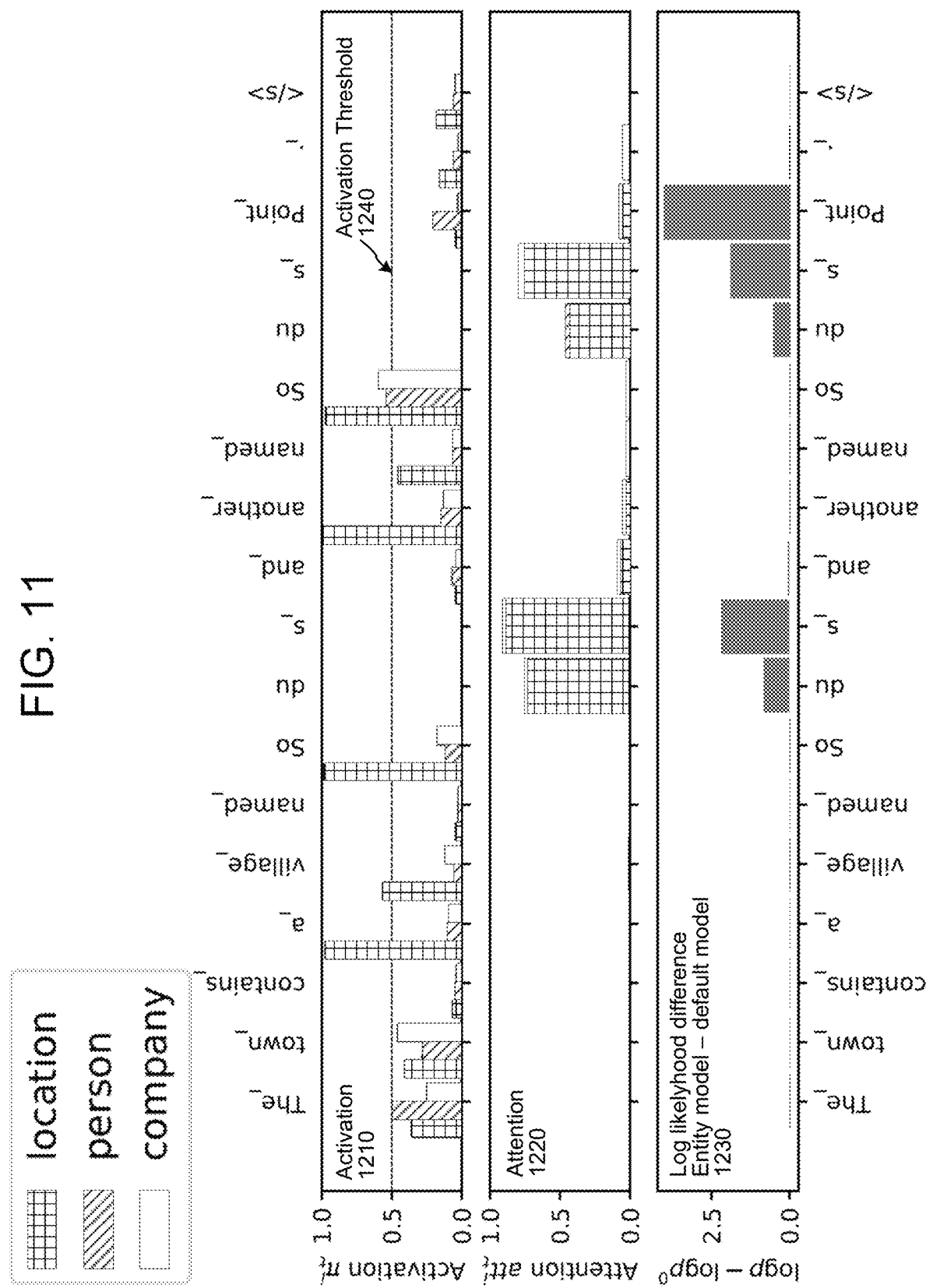
FIG. 11 illustrates an example operation of a speech processing system using the compositional language model, according to embodiments of the present disclosure.

In some cases, a skill or domain may be associated with a vocabulary different from every day speech; for example, interaction with a skill or domain may include words and/or phrases representing names or idiomatic expressions. Transcribing such words and/or phrases at the ASR stage, before a relevant skill or domain has been identified during the NLU stage, may be difficult. Moreover, errors in transcriptions may disrupt downstream NLU processing, entity recognition, and performance of a command by the ultimate skill. To improve ASR results, the ASR component 250 may refer to one or more entity libraries in the ASR model Storage 452. The ASR component 250 can use an entity model in addition to a general model to transcribe the audio data 211. Use of the entity model may present additional challenges, however. For example, while a general model may describe, and be trained with, whole sentences, an entity model may describe only a part of a sentence; for example, the aforementioned names or idiomatic expressions. Furthermore, the ASR model storage 452 may include multiple entity models pertaining to various skills, domains, users, etc. Therefore, a top-level model of the ASR component 250, such as the compositional model described herein, may be trained to learn when invoking an entity model— e.g., for which portion of a sentence—may provide better results than the general model. Thus, the ASR component 250 of the present disclosure may include additional components for activating entity components and determining which output (e.g., from the general model or from one or more activated entity models) represents a best interpretation of the audio data 211. FIG. 10 described further below, illustrates a conceptual diagram of a compositional model of a speech processing system, and FIG. 11 illustrates an example operation of the compositional model.

The remote system 120 may include a TTS component 280 that generates audio data (e.g., synthesized speech) from text data using one or more different methods. Text data input to the TTS component 280 may come from a skill component 290, the orchestrator component 230, or another component of the remote system 120.

In one method of synthesis called unit selection, the TTS component 280 may match text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. By recognizing a user, the remote system 120 may be able to load one or more user specific entity libraries for the user to facilitate ASR. For example, the remote system 120 may load an entity library representing named individuals in a list of individuals in a contact list to aid recognition of names. In another example, the remote system 120 may load an entity library representing an often-used domain or skill. In yet another example, the remote system 120 may load an entity library representing words and/or phrases in one or more languages other than the primary language typically used with the device 110. In at least some examples, the user recognition component 295 may be implemented as a skill component 290.

The user recognition component 295 may recognize one or more users using various data. The user recognition component 295 may take as input the audio data 211 and/or the text data 213. The user recognition component 295 may perform user recognition processing by comparing speech characteristics, in the audio data 211, to stored speech characteristics of users. The user recognition component 295 may additionally or alternatively perform user recognition processing by comparing biometric data (e.g., fingerprint data, iris data, retina data, etc.), received by the remote system 120 in correlation with a current natural language input, to stored biometric data of users. The user recognition component 295 may additionally or alternatively perform user recognition processing by comparing image data (e.g., including a representation of at least a feature of the user 5), received by the remote system 120 in correlation with a current natural language input, with stored image data including representations of features of different users of the user device 110. The user recognition component 295 may perform other or additional user recognition processes, including those known in the art. For a particular natural language input, the user recognition component 295 may perform processing with respect to stored data of users associated with the user device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

Figure 14:
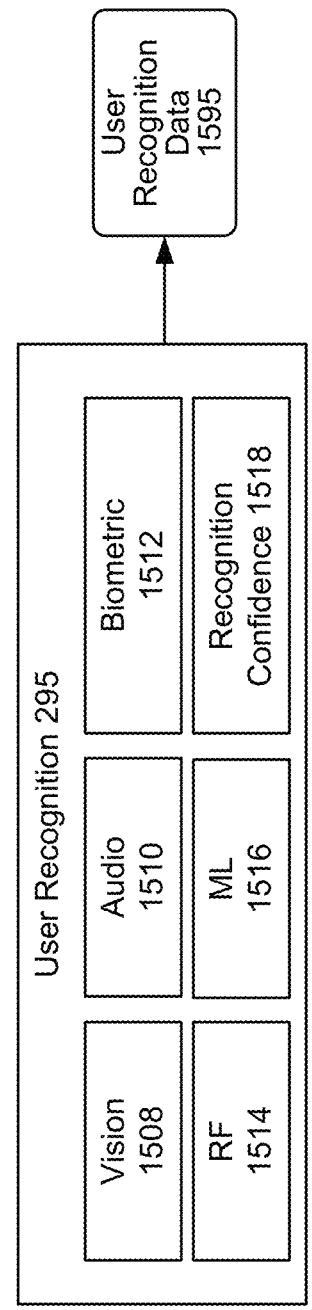
FIG. 14 is a schematic diagram of an illustrative architecture in which sensor data is combined to recognize one or more users according to embodiments of the present disclosure.
Figure 15:
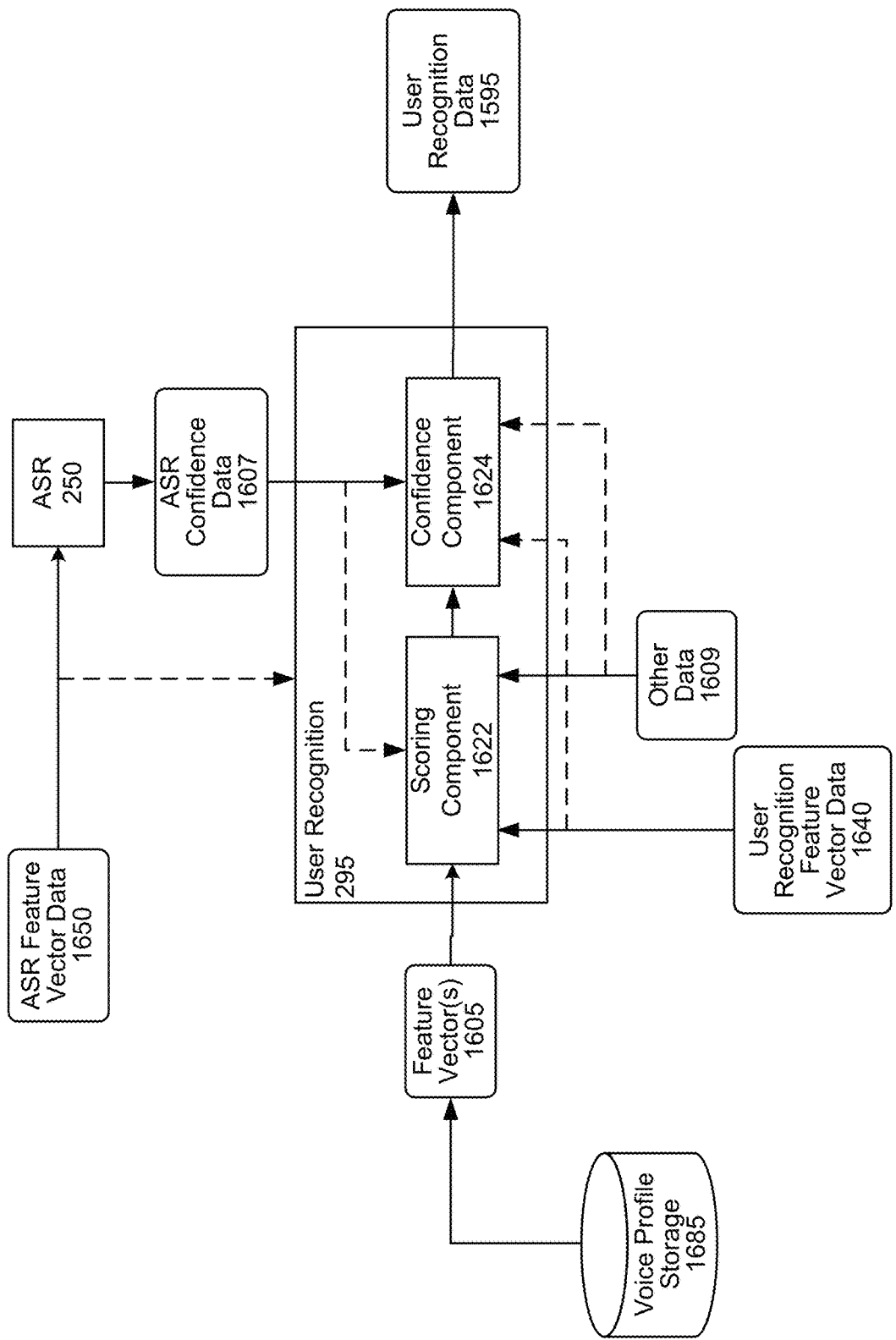
FIG. 15 is a system flow diagram illustrating user recognition according to embodiments of the present disclosure.

The user recognition component 295 may output a single user identifier corresponding to the most likely user that originated the natural language input. Alternatively, the user recognition component 295 may output multiple user identifiers with respective values representing likelihoods of respective users originating the natural language input. The output of the user recognition component 295 may be used to inform NLU processing, processing performed by a skill component(s) 125, as well as processing performed by other components of the remote system 120 and/or other systems. FIGS. 14 and 15, described further below, illustrates how the user recognition component 295 may determine a user identity.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill components 125 that the user has enabled. When a user enables a skill component 290, the user is providing the remote system 120 with permission to allow the skill component 290 to execute with respect to the user's natural language inputs. If a user does not enable a skill component 290, the remote system 120 may not invoke the skill component 290 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

FIG. 3 is a flowchart illustrating an example method of operation of a speech processing system using entity language models, according to embodiments of the present disclosure. The following describes example operations for speech processing using entity language models. The method 300 can be performed, for example, by the remote system 120 and its components described herein.

The method 300 may start by receiving input audio data corresponding to an utterance (350). The input audio data can represent, for example a command spoken by the user 5 to the device 110. Having received the spoken command, the device 110 may transmit the input audio data to the remote system 120.

The method 300 may include processing a first portion of audio data representing the utterance using a first language model, which may be a general language model, to generate first ASR result data including a first token representing first text corresponding to the first portion (352). For some utterances, ASR may benefit from applying user-, context-, and/or domain-specific language model. A specific language model may improve the transcriptions of the ASR component, particularly with regard to words and/or phrases unusual in ordinary speech, but perhaps more common in speech related to a particular subject; for example, movie titles. Typically, however, intent/domain information has not yet been determined at the ASR stage, so the system 100 may incorporate an additional model that may determine which specific library or libraries to invoke based on a word or word recognized in the speech. For example, the sequence of phonemes may include a first portion followed by an adjacent second portion, where each portion may include one or more consecutive phonemes. The system may process the first portion using a first model to generate first ASR result data. The first model may be a default language model. The first ASR result data may include a token. The token may be a subword, word, or phrase potentially represented by the phonemes in the first portion.

The method 300 may include determining, based at least in part on the first token, that the second portion of the audio data potentially relates to a second language model, such as a specific language model (354). Certain words or phrases may indicate that a following word or phrase may belong to a certain category such as an entity class, where a class includes a group of entities related by context or subject. Thus, based on the first token (and, in some cases, one or more tokens preceding the first token), the system 100 may generate context data. In some implementations, the context data may be a fixed-size vector. The system may use the context data to identify a second model (and, in some cases, additional models as well) that may be useful for predicting a subsequent token. The second model may be an entity model specific to a particular entity class. The entity model may include a list of entities belonging to the class as well as entity data (referred to herein as a model embedding) that includes information that the system 100 can use to determine when the entity model may be relevant to received speech. In some implementations, the entity data may be a fixed-size learnable vector. Thus, in some implementations, the method 300 may include calculating an activation value based on the context vector and the entity data vector. If the activation value of an entity model exceeds a threshold, the method 300 may "activate" that entity model such that the system observes the entity model's output with respect to subsequent token predictions, and combines it with the output from the first language model. Entity model activation is discussed in further detail below with reference to FIGS. 10 and 11.

The method 300 may include processing the first token using the second language model to generate second ASR result data including a second token representing second text corresponding to the second portion (356). The system 100 can use the second model to predict a second token based on the first token and, in some cases, additionally based on one or more tokens preceding the first token.

The method 300 may also include processing the first token using the first language model to generate third ASR result data including a third token representing third text corresponding to the second portion (358). The third ASR result data and the second ASR result data may represent competing hypotheses for the interpretation of the second portion. That is, the third ASR result may serve as a baseline, and the method 300 may include determining that the second ASR result data produced by the second model represents a better prediction of the second token that the third ASR result data. In some implementations, respective ASR result data may include a probability. The method 300 may include determining, based on the probabilities associated with the second ASR result data and the third ASR data, which result to include in the ASR output data. Alternatively, the method 300 may include ranking the respective ASR result data in the ASR output data based on the respective associated probabilities. The method 300 may include determining which ASR result data represents the best prediction of the second token based on additional data as well; for example, the context data used during the step 354 to identify the specific model. The method 300 may include using the context data to weight probabilities output by the various models. The process of receiving and weighting ASR result data from the various language models is referred to as "attention," which is discussed in further detail below with reference to FIGS. 10 and 11.

The method 300 may include outputting ASR output data including the first ASR result data and the second ASR result data (360). The ASR result data may be provided to downstream processes such as NLU and skills/speechlets. The system 100 may feedback the ASR result data into the language model(s) for determining subsequent tokens. For example, the method 300 may include using the second or third token to determine a fourth token representing fourth text corresponding to a third portion of the sequence of phonemes by repeating some or all of the steps 352-360.

Figure 4:
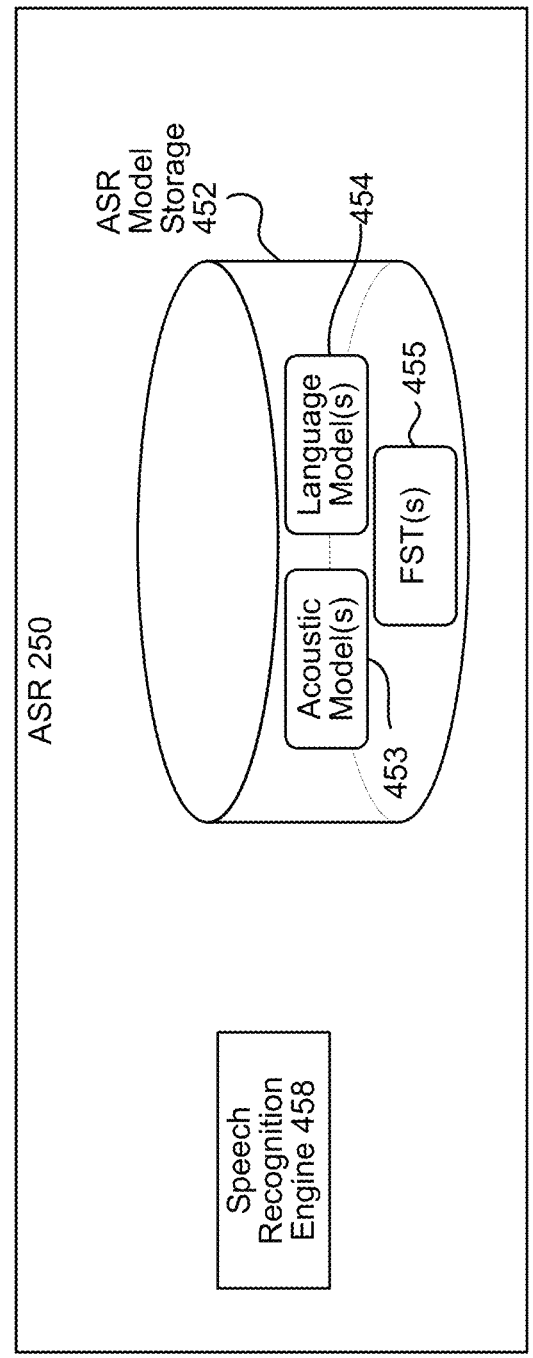
FIG. 4 is a conceptual diagram of ASR components, according to embodiments of the present disclosure.

FIG. 4 is a conceptual diagram of an ASR component 250, according to embodiments of the present disclosure. The ASR component 250 may interpret a spoken natural language input based on the similarity between the spoken natural language input and pre-established language models 454 stored in an ASR model storage 452. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 455 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 458. The ASR component 250 receives audio data 211 (for example, received from a local device 110 having processed audio detected by a microphone by an acoustic front end (AFE) or other component). The speech recognition engine 458 compares the audio data 211 with acoustic models 453, language models 454, FST(s) 455, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 458 may process the audio data 211 with reference to information stored in the ASR model storage 452. Feature vectors of the audio data 211 may arrive at the system 120 encoded, in which case they may be decoded prior to processing by the speech recognition engine 458.

Figure 5:
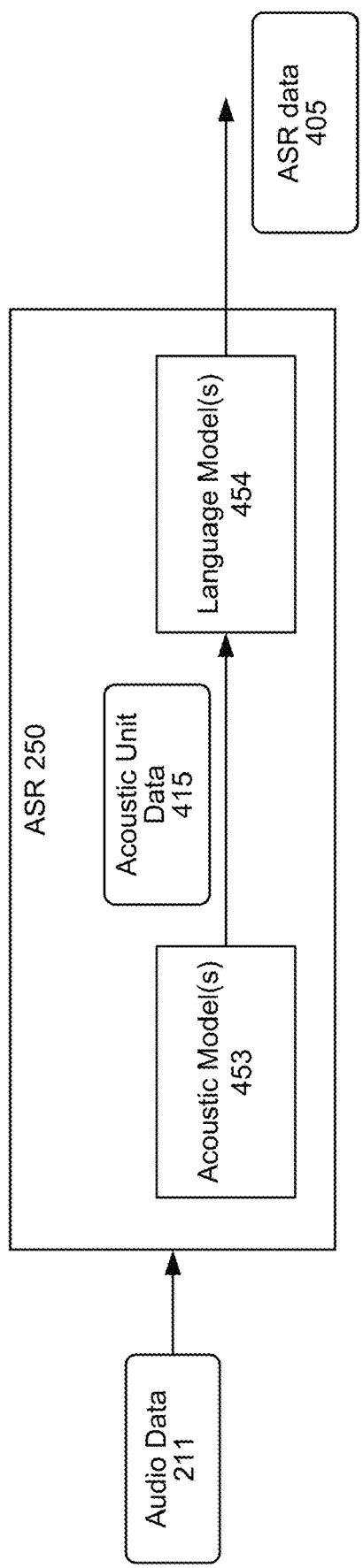
FIG. 5 is a conceptual diagram showing ASR processing using ASR components, according to embodiments of the present disclosure.

FIG. 5 is a conceptual diagram showing ASR processing in an ASR component 250, according to embodiments of the present disclosure. The speech recognition engine 458 attempts to match received feature vectors to language acoustic units (e.g., phonemes) and words as known in the stored acoustic models 453, language models 454, and FST(s) 455. For example, as illustrated in FIG. 5, the audio data 211 may be processed by one or more acoustic model(s) 453 to determine acoustic unit data 415. The acoustic unit data 415 may include indicators of acoustic units detected in the audio data 211 by the ASR component 250. For example, acoustic units can consist of one or more of phonemes, diaphonemes, tonemes, phones, diphones, triphones, or the like. The acoustic unit data 415 can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data 415 may be processed using the language model 454 (and/or using FST 455) to determine ASR data 505. The ASR data can include one or more hypotheses. One or more of the hypotheses represented in the ASR data 505 may then be sent to further components (such as the NLU component 260) for further processing as discussed herein.

The speech recognition engine 458 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 458 may use the acoustic model(s) 453 to attempt to match received audio feature vectors to words or subword acoustic units. An acoustic unit may be a senone, phoneme, phoneme in context, syllable, part of a syllable, syllable in context, or any other such portion of a word. The speech recognition engine 458 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 458 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 6:
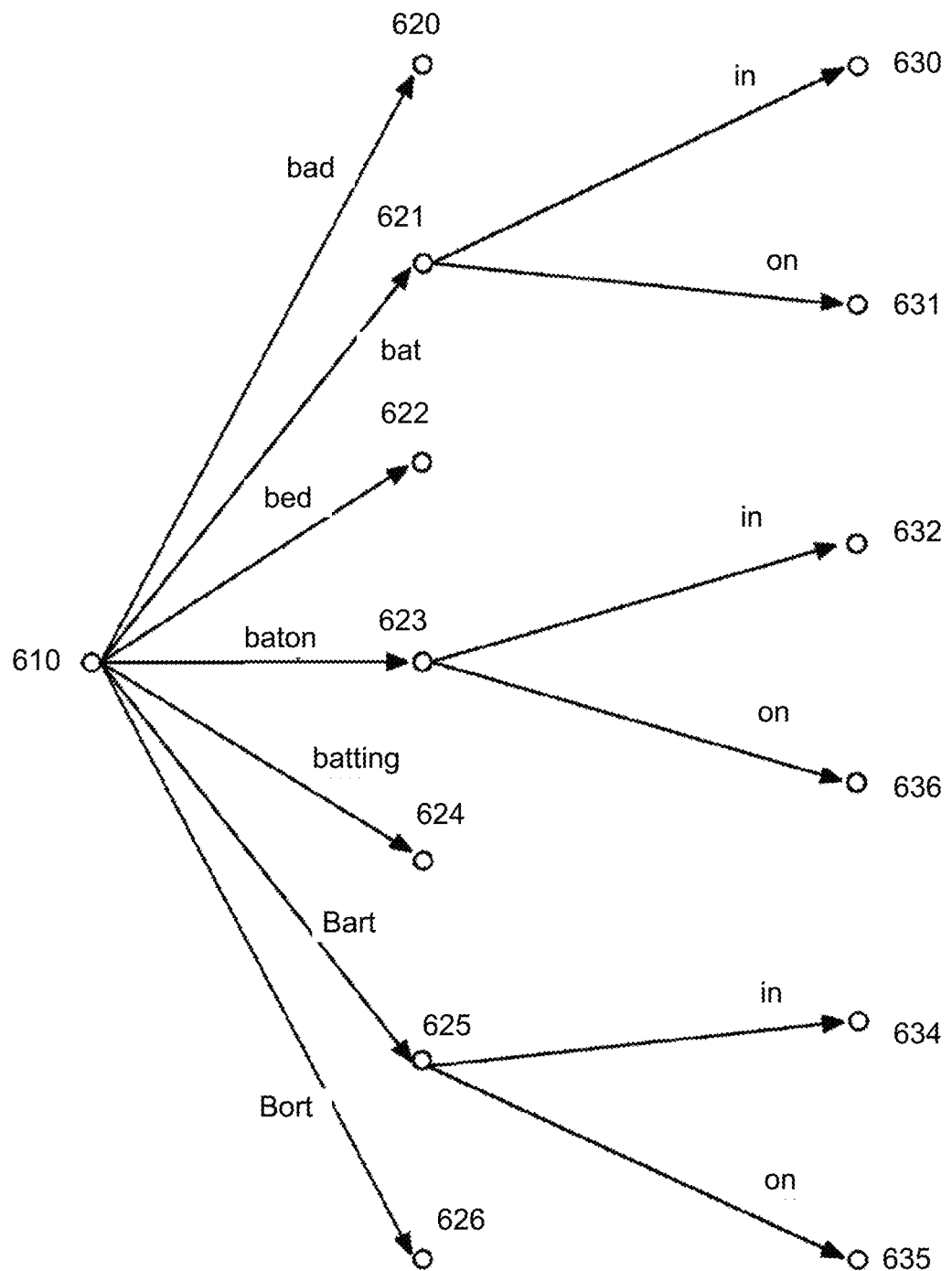
FIG. 6 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 6 shows an example of a word result network that may be used by an ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 6, the paths shown include, for example, "bad", "bat in", "bat on", "bed", "baton in", "baton on", " "batting", "Bart in", "Bart on", and "Bort".

As illustrated in FIG. 6, a word result network may start at initial node 610. At node 610, no words may have been recognized yet as the ASR engine 258 commences its processing. From node 610, the ASR engine 258 may create arcs and additional nodes where each arc may be associated with a potential word that may be recognized. In some applications, words may be represented by nodes instead of arcs. In FIG. 6, arcs from node 610 to nodes 620 to 626 are labeled with example words that may be recognized by the ASR engine 258.

From initial node 610, the ASR engine 258 may apply acoustic and language models to determine which of the arcs leaving node 610 are most likely to occur. For an acoustic model employing HMMs, ASR engine 258 may create a separate HMM for each arc leaving node 610. Applying the acoustic and language models the ASR engine 258 may decide to pursue some subset of the arcs leaving node 610. For example, in FIG. 6, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR component 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 6 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 6. The word result network of FIG. 6 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included. Further, a domain specific language model may be configured based on the words that may be expected for a particular domain.

An FST may be constructed based on the text corpus that includes a large amount of text representing sentences that may be spoken by users. The FST is thus constructed so that it may represent a large number (though not necessarily infinite) number of potential sentences that may be spoken.

The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by an ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end state where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through states in the FST, it may assign a score to each state or arc on the FST. After traversing an arc, the score of the arc of the FST, the score of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus, a certain number of states may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 8, discussed below. After traversing the FST, the path with the best score (which may be the highest score or lowest score depending on the configuration of the FST) may be selected as the most likely path.

FIGS. 7A-7D illustrate different a small section of an ASR FST. In particular, FIGS. 7A-7D a small portion of an FST that may be traversed when processing audio data representing speech and determining whether that audio data corresponds to the word "bat" or the word "bad." The FST portion shows a single start state (state 0 shown in FIG. 7A) and multiple end states (states 62, 68, 69, 81, 82, and 83, shown in FIGS. 7C and 7D). In a full FST for speech processing there may be one or multiple start states and many more end states. Further, the end states may be located at various locations throughout the FST to represent different potential end portions that may be received by a potential utterance.

As can be seen in FIGS. 7A-7D, each state has one or more arcs outgoing from it that lead from the particular state to the next state. Each arc is associated with an input label, an output label and a score, shown in the figures as [input label]:[output label]/[score]. Thus, for example, arc 702 outgoing from state 0 to state 2 has an input label of 10, an output label of <eps> (explained below) and a score of 0.15137. The scores illustrated in FIGS. 7A-7D the scores represent scores or "costs" of each arc, where a lower scoring arc represents an arc that is more likely to be traversed/chosen than a higher scoring arc. In the present illustration of FIGS. 7A-7D, the illustrated scores roughly correspond to the negative logarithm of the probability of the particular arc may be traversed, but multiple scoring configurations are possible. Further, the scores illustrated in FIGS. 7A-7D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 7A-7D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 7A-7D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 702 outgoing from state 0 in FIG. 7A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 704 from state 0 to state 3, 5480 in arc 706 outgoing from state 0 to state 5, 16 in arc 708 outgoing from state 0 to state 1, and 2 in arc 710 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 7A-7D, however, many arcs have a label <eps> (either as input label or as output label) which represents the label epsilon (E). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 730 from state 10 to state 15 as there is no input label on that arc that refers to an indexed acoustic unit. The ASR engine 258, however, will not traverse arc 732 outgoing from state 15 until a new audio feature vector is processed, as arc 732 has an input label of 5570, which refers to an acoustic unit, thus requiring a new audio feature vector be processed before arc 732 is traversed.

Figure 7A:
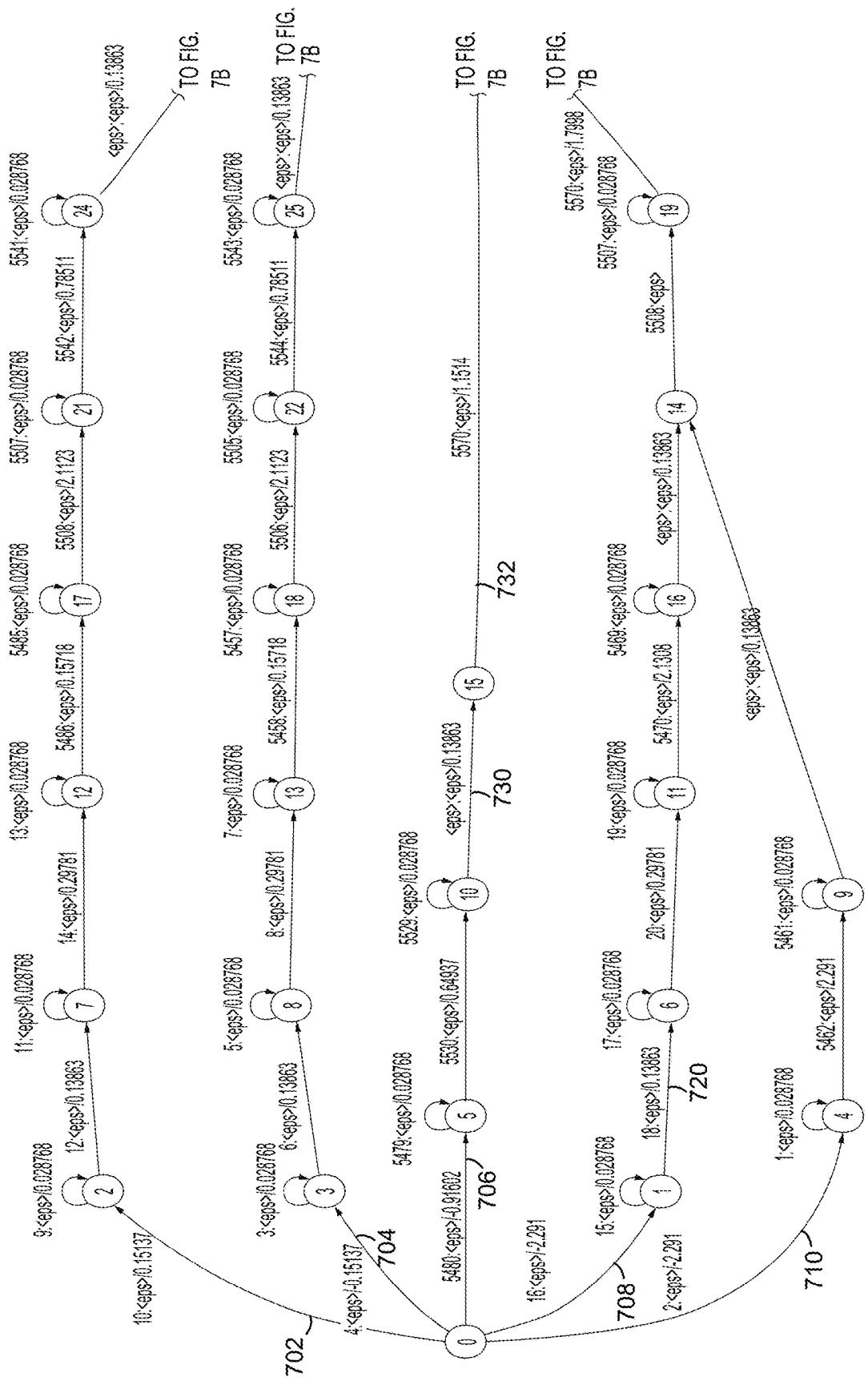
Figure 7D:
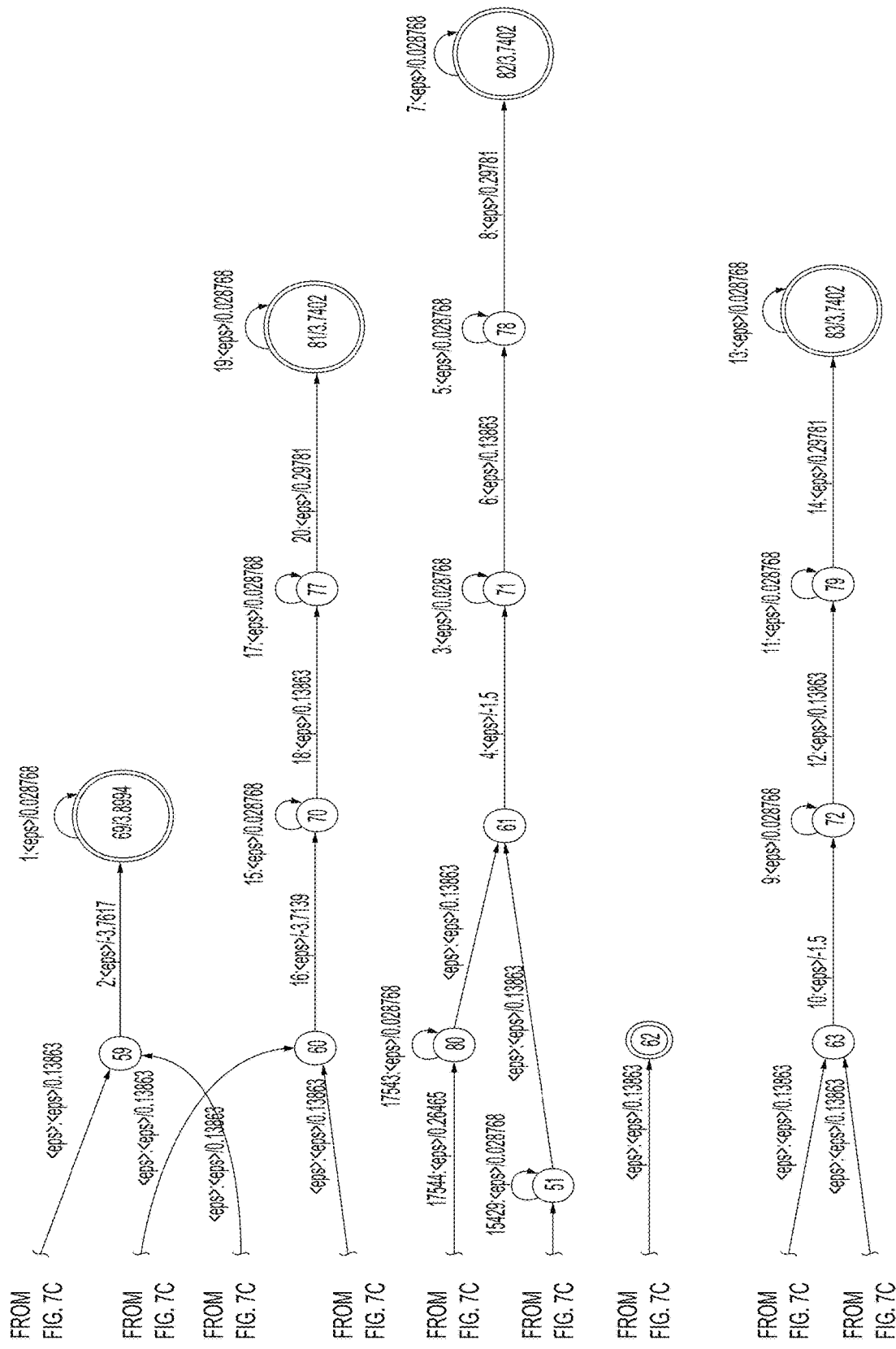

Only certain portions of an FST have an output label. For example, as shown in FIG. 7B, only arcs 740 and 742 have an output label. Arc 740, from state 23 to state 26 has an output label of "bad" and arc 742 from state 23 to state 27 has an output label of "bat." Because the FST portion of FIGS. 7A-7D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 7A-7D, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
(2) Offset in the arc array pointing to the beginning of the list of arcs outgoing from the state,
(3) Number of outgoing arcs with epsilon (∈) input label, and
(4) Number of outgoing arcs with epsilon (∈) output label.

Each of these fields may be represented by a particular N-bit integer (e.g., 16, 32, etc.). The integer size for a particular field may be different from that of a different field.

Thus, to represent a state with may outgoing arcs (for example, state 0 in FIG. 7A) the table entry for state 0 would include a final score of state 0, a pointer to the arc table corresponding to an arc table entry for a first arc outgoing from state 0 (for example 702), a number of outgoing arcs from state 0 with a null epsilon input label and a number of outgoing arcs from state 0 with a null epsilon input label. As FIG. 7A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 720. The system may thus determine that any arcs from 702 up to, but not including 720, are outgoing from state 0.

The arcs table may contain the following information for each arc:

(1) Arc score,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, for example arc 720, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 7A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 702 (which corresponds to unit 10). The scores may be added together, multiplied, or any other technique of combination. The resulting combined score may then be maintained by the system as the processed score corresponding to arc 702. The same process may be performed for each of the arcs outgoing from state 0 (as each of them have an input label corresponding to an acoustic unit) based on the scores corresponding to the acoustic units of their respective input labels, thus resulting in:

$$\text{Updated score for } 702 = 0.84451 + (s_1 * sf)$$

$$\text{Updated score for } 704 = 0.84451 + (s_2 * sf)$$

$$\text{Updated score for } 706 = -0.22287 + (s_3 * sf)$$

$$\text{Updated score for } 708 = -1.5979 + (s_4 * sf)$$

$$\text{Updated score for } 710 = -1.5979 + (s_5 * sf)$$

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 7A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the ASR may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the ASR engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 8:
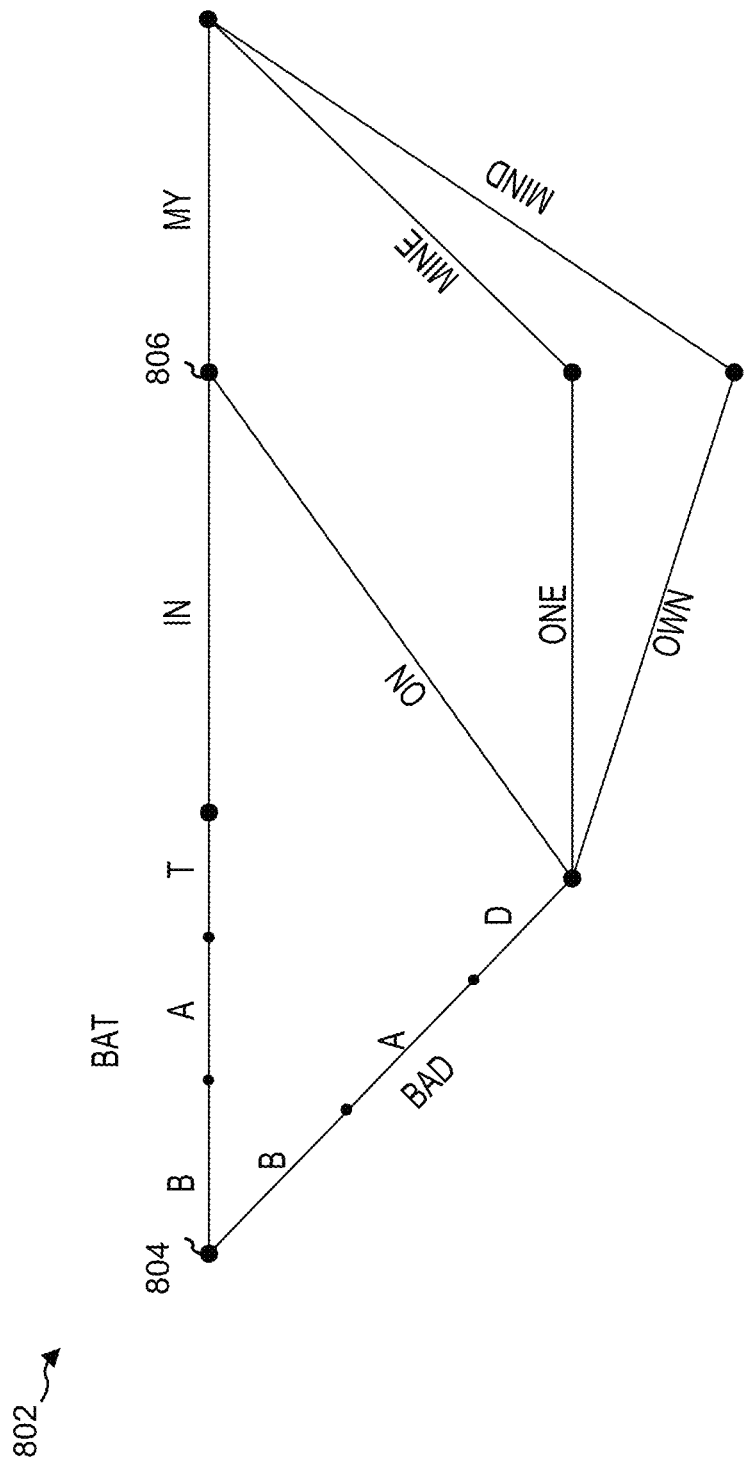
FIG. 8 illustrates a word lattice according to embodiments of the present disclosure.

As the ASR engine traverses portions of the FST, it may use the table of tokens representing the states and arcs traversed, along with their combined scores, to create a lattice of potential paths representing potential ASR results. A sample lattice is shown in FIG. 8. The lattice 802 shows multiple potential paths of speech recognition results that may have been determined by the ASR engine 258 by traversing an FST or by using different acoustic model/ language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 804 and node 806 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a speechlet component (skill) 290 for further processing (such as execution of a command included in the interpreted text). Thus the data preserved by the ASR engine 258 during traversal of the FST may result in a lattice representing the most likely possible ASR results (as the least likely results were discarded during pruning).

The mostly likely path of the ASR results, sometimes called the Viterbi path, may be selected as the top scoring result for command execution.

FSTs can constitute the bulk of an ASR model, with HCLG being particularly large, sometimes reaching tens of gigabytes in some models. As noted above, an HCLG functionality maybe incorporated into a single FST. In other configurations, HCL functionality may be incorporated in one FST, whereas G functionality (i.e., functionality of a grammar or language model) may be incorporated into a different FST. In such a situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 9:
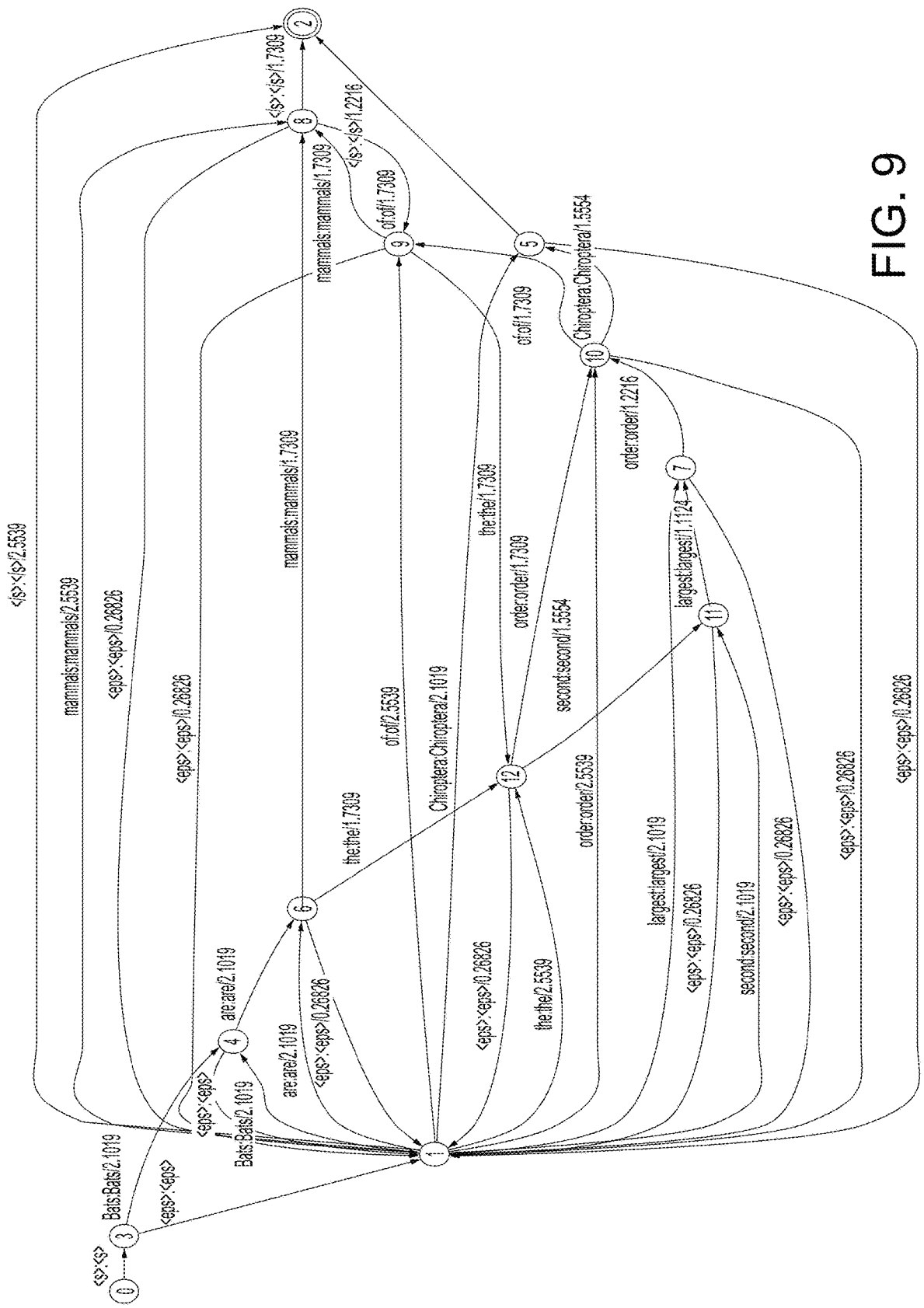
FIG. 9 illustrates a section of a finite state transducer according to embodiments of the present disclosure.

An example of a portion of a G FST is shown in FIG. 9. The FST portion shown in FIG. 9 is a portion of a G FST language model constructed from two sentences, the first being "bats are mammals of the order Chiroptera" and the second being "bats are the second largest order of mammals." The portion of the FST shown in FIG. 9 may normally appear in a much larger FST as part of a general ASR language model, but is shown in FIG. 9 for purposes of illustration. Further, while a complete G FST may be configured to recognize any sequence of the words shown in FIG. 9, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (also called a bi-gram) includes two words in order for example "I am," "I think," or the like. A size 3 N-gram (also called a trigram) includes two words in order for example "I like to," "I need to," or the like. Certain benefits to representing word groupings as N-grams in a language model FST include their ease of construction, fast computation during runtime decoding of input speech and efficient representation within the FST.

FIG. 10 is a conceptual diagram of components of a compositional language model 1000 of a speech processing system, according to embodiments of the present disclosure. In some implementations, the compositional language model 1000 may include the default language model. In some implementations, the compositional language model 1000 may operate in addition to the default language model; for example, in parallel. The compositional language model 1000 can take as input a word or sequence of words and output a predicted next word. Time is indicated as "t", and each word is denoted "w," so the input is the previous word $w_{t-1}$, and the output is the predicted succeeding word $p(w_t)$. The compositional language model 1000 has several component including a context encoder 1010, an activation component 1020, an attention component 1030, one or more entity models 1040, and one or more model embeddings 1050, where each model embedding may correspond to an entity model 1040.

Entity models 1040 (and thus model embeddings 1050) may be denoted 1-i (or 0-i, etc.), where the superscript indicates a model-specific item. So, for example, each entity model 1040(i) may output a predicted word $p^i(w_t)$. An entity model 1040 may be a language model that may yield $p^i(w_t|w_{<t})$. One model (e.g., i=0), may be designated as the default model. The default model may span the entire sentence (e.g., always active). The default model can serve as a baseline model, and the compositional model Y1000 may seek to adapt and improve on those results using the additional entity models 1040(1-i). An entity model 1040 may be implemented as a stateful function, for example, $F^i:S^i(w_{<t-1}), w_{t-1} \rightarrow S^i(w_{<t}), p(w_t)$, with a special start state $S^i(0)$. In some implementations, the entity models 1040 may be long short-term memory (LSTM)-based and FST-based models. An entity model 1040 may be trained/learned independently of other entity models 1040. The entity models 1040 may share a vocabulary of word (or subword) tokens. Some entity models 1040 may represent entire sentences while others may represent only parts of sentences; for example, specific entity types. The data in the entity models 1040 may overlap or duplicate other models or indices of the remote system 120; for example the gazetteers 1384 and/or the search index 1462 discussed below.

The model embeddings 1050 may represent a trainable aspect of the compositional model 1000. The entity models 1040 may remain fixed, and the model embeddings 1050 may store data representing where a corresponding entity model 1040 may be relevant based on context, and thus activated. In some implementations, a model embedding 1050 can be expressed as a vector $ce^i$ for each entity model 1040(i). In some implementations, a model embedding vector can be of fixed length.

The context encoder 1010 may input information regarding one or more previous words (e.g., $w_{t-1}$ and/or $w_{<t-1}/w_{<t}$) and/or other information and can map a variable-length word sequence (e.g., of one or more words) $w_{<t}$ into a vector or other representative data $ctx_t$, which may serve as an input to the activation component 1020 and attention component 1030. The data representing the previous words (e.g., $w_{t-1}$ and/or $w_{<t-1}/w_{<t}$) may be in the form of a vector indicating what word(s) occurred previously. The vector representing the previous word(s) may also include data corresponding to one or more word embeddings such as GloVe (Global Vectors for Word Representation), BERT (Bidirectional Encoder Representations from Transformers), or other word representations. In some implementations, a context vector can be of fixed length. In some implementations, an LSTM network may encode the context $w_{<t}$ with input embedding $e(w_{<t})$ as follows:

$$ctx_t = LSTM(e(w_{<t}))$$

The context encoder 1010 may consider other data as well. For example, and without limitation, the other data may include user recognition data 1595 and/or user profile data; a type, location, or capabilities of the device 110; recent and/or long-term history of use (for example, recent searches related to restaurants, movies, consumer products, etc.); a time of the day or day of the week; and/or word embeddings. The following are non-limiting examples of words and/or phrases that may cause the compositional model 1000 to activate a particular entity model 1040. Detecting words such as "call," "text," or "email" may lead to activation of an entity model corresponding to one or more contact lists. Detecting words such as "directions," "navigation," "at," "in," or "to" may lead to activation of entity models related to locations. Detecting words such as "movie," "theater," or "show times" may lead to activation of entity models related to movies. Detecting words such as "play" may lead to activation of entity models related to music and/or videos, possibly depending on the capabilities of the receiving device 110.

The activation component 1020 can activate an entity model 1040 such that it begins predicting words. Some entity models 1040 may describe (generate) only part of a sentence, and can therefore be activated when the context suggests its output may be useful. The activation component 1020 can provide a signal to an entity model 1040 to indicate when the entity model 1040 should generate a first word; e.g., output $p^i(w|<s>)$, where $<s>$ is a start indicator.

In some implementations, an entity model 1040 may be an FST-based model. In such cases, the activation signal $act^i_t=1$ can reset the FST state to its start. When $act^i_t=0$, the model can generate the next token given its state and $w_{t-1}$.

In some implementations, an entity model 1040 may be an LSTM-based model. In such cases, the activation signal $act^i_t=1$ can reset the LSTM state to zero values and replace the previous word $w_{t-1}$ with $<s>$ (but only for that specific entity model 1040).

The activation component 1020 can generate the activation signal $act^i_t$ based on an activation policy function $\pi^i_t$, which can express a probability of activating an entity model 1040($i$) at a time i according to the following equation:

$$\pi^i_t = \sigma(\text{PROJ}(\text{LSTM}(ctx_t, ce^i, act^i_{t-1}, \log p^i(w_{t-1}=</s>|w_{t-1}, act^i_{<t})))) $$

where commas indicate concatenation, $</s>$ is a termination indicator (e.g., end-of-sentence), $act^i_{t-1}$ can represent activation of the entity model 1040($i$) at $t-1$, and $\log p^i(w_{t-1}=</s>)$ can represent the log probability of the entity model 1040($i$) generating an $</s>$ at $t-1$. The log probability of an $</s>$ can provide a strong signal to the activation component 1020 that an entity model 1040 is unlikely to produce additional useful output for this activation. PROJ can be a linear projection (with bias) mapping the LSTM output to scalar input to sigmoid activation function $\sigma$.

The attention component 1030 can interpolate the outputs of the entity model(s) 1040. The following formula represents an example interpolation of the model outputs:

$$p(w_t|w_{<t}, act^{1,...N}_{\le t}) = \sum_{i=0}^{N} \alpha^i_t \cdot p^i(w_t|w_{<t}, act^i_{\le t})$$

where $\alpha^i_t = \dfrac{\exp(att^i_t)}{\sum_{i=0}^{N} \exp(att^i_t)}$ where:

$$att^i_t = \text{PROJ}(\text{LSTM}(ctx_t, ce^i, act^i_t, \log p^i(w_t=</s>|w_{<t}, act^i_{<t})))$$

The formula for $att^i_t$ is structurally similar to that of activation $act^i_t$; however, while activation may be computed independently for each entity model 1040, attention coefficients $\alpha^i_t$ may be normalized across all entity models 1040 ($i$).

The activation component 1020 and the attention component 1030 have similar structure and a related function: they compare an entity model's 1040 embedding against a sentence context captured by the context encoder 1010. When an entity model 1040 generates a limited span—e.g., within a sentence—it is important to know where the span starts and ends. Start ($<s>$) is learned by the activation component 1020 and it is the responsibility of the attention component 1030 to learn where a component ends ($</s>$). However, the attention component 1030 does not have access to the content of the entity model 1040, therefore, it may use an end indicator signal from the entity model 1040 itself. Accordingly, the attention component 1030 can receive $act^i_t$ and $\log p^i(w_t=</s>)$ as inputs. The activation component 1020 may get the same signals, but from the previous step $t-1$: $act^i_{t-1}$ and $\log p^i(w_{t-1}=</s>)$. Note that an entity model 1040 predicting an $</s>$ may signal the end of its span, but not necessarily the end of sentence, which may be represented by the same $</s>$ token if output by the general language model. The attention component 1030 may learn to reduce attention to the entity model 1040 once the latter starts generating $</s>$ with high probability until the component is activated again. In this manner, representing the span on an entity model 1040 may be agnostic to the entity model's 1040 internal structure, and may work well with both neural and FST-based components. FIG. 11, described further below, illustrates an example operation of a speech processing system using the compositional language model.

FIG. 11 illustrates an example operation of a speech processing system using the compositional language model, according to embodiments of the present disclosure. FIG. 11 illustrates an example of how the activation component 1020 and the attention component 1030 can work together to improve upon baseline results produced by a general language model. The example operation shown in FIG. 11 has three entity models 1040 in addition to a default model. The three entity models 1040 are location, person, and company. The location entity model 1040 may include a list of location names, the personal entity model 1040 may include a list of named individuals (e.g., from an address book or contact list), and the company entity model 1040 may include a list of company names.

The top graph 1210 shows activation $\pi^i_t$, the middle graph 1220 shows attention $att^i_t$, and the bottom graph 1230 shows the difference in token log-likelihood between the entity model 1040 and the default model $\log p^i - \log p^0$. Activation is independent for each entity model 1040; however attention quantities are stacked and sum to 1 (including the general language model which is not shown). In the example of FIG. 11, a threshold of 0.5 is indicated by the dotted line 1240; that is, in this example, an activation value over a threshold of 0.5 will trigger activation for that entity model 1040.

The top graph 1210 shows activation for the location entity model 1040 at positions where a location is plausible. The attention component 1030, however, moderates the probability mass assigned to the location entity model 1040, as well as noting where the span relevant to location ends; e.g., where an entity model can be deactivated.

FIGS. 12 and 13 illustrates how the NLU component 260 may perform NLU processing. FIG. 12 is a conceptual diagram of how natural language processing is performed, according to embodiments of the present disclosure. And FIG. 13 is a conceptual diagram of how natural language processing is performed, according to embodiments of the present disclosure. The NLU component 260 may include one or more recognizers 1363. In at least some embodiments, a recognizer 1363 may be associated with a skill system 125 (e.g., the recognizer may be configured to interpret text data to correspond to the skill system 125). In at least some other examples, a recognizer 1363 may be associated with a domain (e.g., the recognizer may be configured to interpret text data to correspond to the domain).

Recognizers 1363 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 260 may communicate with various storages. The NLU component 260 may communicate with an NLU storage 1373, which includes skill system grammars (1376a-1376n), representing how natural language inputs may be formulated to invoke skill systems 125, and skill system intents (1378a-1378n) representing intents supported by respective skill systems 125.

Each recognizer 1363 may be associated with a particular grammar 1376, a particular intent(s) 1378, and a particular personalized lexicon 1386 (stored in an entity library 1382). A gazetteer 1384 may include skill system-indexed lexical information associated with a particular user. For example, Gazetteer A (1384a) may include skill system-indexed lexical information 1386aa to 1386an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 1363 may include a NER component 1362 that attempts to identify grammars and lexical information that may be used to construe meaning with respect to text data input therein. A NER component 1362 identifies portions of text data that correspond to a named entity that may be recognizable by the system 120. A NER component 1362 may also determine whether a word refers to an entity that is not explicitly mentioned in the text, for example "him," "her," "it" or other anaphora, exophora or the like.

A NER component 1362 applies grammar models 1376 and lexical information 1386 associated with one or more skill systems 125 to determine a mention of one or more entities in text data input therein. In this manner, a NER component 1362 identifies "slots" (e.g., particular words in text data) that may be needed for later processing. A NER component 1362 may also label each slot with a type (e.g., noun, place, city, artist name, song name, etc.).

Each grammar model 1376 may include the names of entities (e.g., nouns) commonly found in speech about a particular skill system 125 to which the grammar model 1376 relates, whereas lexical information 1386 may be personalized to the user identifier output by a user recognition component 295 for the natural language input. For example, a grammar model 1376 associated with a shopping skill system may include a database of words commonly used when people discuss shopping.

A downstream process called named entity resolution actually links a portion of text data (identified by a NER component 1362) to a specific entity known to the system 120. To perform named entity resolution, the NLU component 260 may use gazetteer information (1384a-1384n) stored in the entity library storage 1382. The gazetteer information 1384 may be used to match text data (identified by a NER component 1362) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 1363 may also include an IC component 1364 that processes text data input thereto to determine an intent(s) of a skill system(s) 125 that potentially corresponds to the natural language input represented in the text data. An intent corresponds to an action to be performed that is responsive to the natural language input represented by the text data. An IC component 1364 may communicate with a database 1378 of words linked to intents. For example, a music intent database may link words and phrases such as "quiet," "volume off," and "mute" to a <Mute> intent. An IC component 1364 identifies potential intents by comparing words and phrases in text data to the words and phrases in an intents database 1378 associated with the skill system(s) 125 that is associated with the recognizer 1363 implementing the IC component 1364.

The intents identifiable by a specific IC component 1364 may be linked to one or more skill system-specific grammar frameworks 1376 with "slots" to be filled. Each slot of a grammar framework 1376 corresponds to a portion of text data that a NER component 1362 believes corresponds to an entity. For example, a grammar framework 1376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 1376 may not be structured as sentences, but rather based on associating slots with grammatical tags.

For example, a NER component 1362 may identify words in text data as subject, object, verb, preposition, etc. based on grammar rules and/or models prior to recognizing named entities in the text data. An IC component 1364 (implemented by the same recognizer 1363) may use the identified verb to identify an intent. The NER component 1362 may then determine a grammar model 1376 associated with the identified intent. For example, a grammar model 1376 for an intent corresponding to <PlayMusic> may specify a list of slots applicable to play the identified "object" and any object modifier (e.g., a prepositional phrase), such as {Artist Name}, {Album Name}, {Song name}, etc. The NER component 1362 may then search corresponding fields in a lexicon 1386, attempting to match words and phrases in the text data the NER component 1362 previously tagged as a grammatical object or object modifier with those identified in the lexicon 1386.

A NER component 1362 may perform semantic tagging, which is the labeling of a word or combination of words according to their type/semantic meaning. A NER component 1362 may parse text data using heuristic grammar rules, or a model may be constructed using techniques such as hidden Markov models, maximum entropy models, log linear models, conditional random fields (CRF), and the like. For example, a NER component 1362, implemented by a music skill system or music domain recognizer 1363, may parse and tag text data corresponding to "play the well-tempered clavier by johann sebastian bach" as {Verb}: "Play," {Object}: "the well-tempered clavier," {Object Preposition}: "by," and {Object Modifier}: "johann Sebastian bach." The NER component 1362 may identify "Play" as a verb based on a word database associated with the music skill system or music domain, which an IC component 1364 may determine corresponds to a <PlayMusic> intent. At this stage, no determination has been made as to the meaning of "the well-tempered clavier" and "johann Sebastian bach," but based on grammar rules and models, the NER component 1362 has determined that the text of these phrases relates to the grammatical object (e.g., entity).

The frameworks linked to the intent are then used to determine what database fields should be searched to determine the meaning of these phrases, such as searching a user's gazetteer 1384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 1384 does not resolve a slot/field using gazetteer information, the NER component 1362 may search a database of generic words (in the knowledge base 1372). For example, if the text data corresponds to "play songs by johann Sebastian bach," after failing to determine an album name or song name called "songs" by "johann sebastian bach," the NER component 1362 may search a music skill system vocabulary for the word "songs." In the alternative, generic words may be checked before the gazetteer information, or both may be tried, potentially producing two different results.

A recognizer 1363 may tag text data to attribute meaning thereto. For example, a recognizer 1363 may tag "play the well-tempered clavier by johann sebastian bach" as: {skill system} Music, {intent} Play Music, {artist name} johann sebastian bach, {media type} SONG, and {song title} the well-tempered clavier. For further example, a recognizer 1363 may tag "play songs by johann sebastian bach" as: {skill system} Music, {intent} Play Music, {artist name} johann sebastian bach, and {media type} SONG.

As described above, more than one recognizer 1363 may process with respect to text data representing a single natural language input. In such instances, each recognizer 1363 may output NLU hypothesis data including at least one NLU hypothesis including an intent indicator (determined by an IC component 1364 of the recognizer 1363) and at least one tagged named entity (determined by a NER component 1362 of the recognizer 1363).

The NLU component 260 may compile the NLU hypotheses (output by multiple recognizers 1363) into cross-recognizer N-best list data 1440. Each NLU hypothesis may be associated with a respective score indicating a likelihood that the NLU hypothesis corresponds to the domain, one or more skill systems 125, etc. associated with the recognizer 1363 from which the NLU hypothesis was output. For example, the cross-recognizer N-best list data 1440 may be represented as:

[0.95] Intent: <PlayMusic> ArtistName: Beethoven SongName: Waldstein Sonata
[0.70] Intent: <PlayVideo> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata with each line of the foregoing corresponding to a different NLU hypothesis and associated score.

The NLU component 260 may send the cross-recognizer N-best list data 1440 to a pruning component 1450, which sorts the NLU hypotheses, represented in the cross-recognizer N-best list data 1440, according to their respective scores. The pruning component 1450 may then perform score thresholding with respect to the cross-recognizer N-best list data 1440. For example, the pruning component 1450 may select NLU hypotheses, represented in the cross-recognizer N-best list data 1440, associated with scores satisfying (e.g., meeting and/or exceeding) a threshold score. The pruning component 1450 may additionally or alternatively perform number of NLU hypothesis thresholding. For example, the pruning component 1450 may select a threshold number of top-scoring NLU hypotheses represented in the cross-recognizer N-best list data 1440.

The pruning component 1450 may generate cross-recognizer N-best list data 1460 including the selected NLU hypotheses. The purpose of the pruning component 650 is to create a reduced list of NLU hypotheses so that downstream, more resource intensive, processes may only operate on NLU hypotheses that most likely represent the natural language input.

The NLU component 260 may include a light slot filler component 1452 that takes text from slots, represented in the NLU hypotheses output by the pruning component 1450, and alter it to make the text more easily processed by downstream components. The light slot filler component 1452 may perform low latency operations that do not involve heavy operations such as reference to a knowledge base. The purpose of the light slot filler component 1452 is to replace words with other words or values that may be more easily understood by downstream components. For example, if a NLU hypothesis includes the word "tomorrow," the light slot filler component 1452 may replace the word "tomorrow" with an actual date for purposes of downstream processing. Similarly, the light slot filler component 1452 may replace the word "CD" with "album" or the words "compact disc." The replaced words are then included in the cross-recognizer N-best list data 1460.

The cross-recognizer N-best list data 1460 may be sent to an entity resolution component 1470. The entity resolution component 1470 can apply rules or other instructions to standardize labels or tokens in the NLU hypotheses represented in the cross-recognizer N-best list data 1460. The precise transformation may depend on the skill system 125, domain, etc. to which a NLU hypothesis relates. For example, for a travel skill system-specific NLU hypothesis, the entity resolution component 1470 may transform text corresponding to "Boston airport" to the standard BOS three-letter code referring to the airport. The entity resolution component 1470 can refer to a knowledge base that is used to specifically identify the precise entity referred to in each slot of each NLU hypothesis represented in the cross-recognizer N-best list data 1460.

Specific intent/slot combinations may also be tied to a particular source, which may then be used to resolve the text. In the example "play songs by the stones," the entity resolution component 1470 may reference a personal music catalog, Amazon Music account, a user profile, or the like with entity data that the entity resolution component 1470 can leverage to identify entities corresponding to slots or entity mentions in the cross-recognizer N-best list data 1460. The entity resolution component 1470 may refer to one or more search indices 1462. The search index 1462 may be a data structure including one or more lists, tables, catalogs, etc. In some cases, the search index 1462 can include similar or same entity lists as contained in the entity models 1040 stored in the ASR model storage 452. The entity resolution component 1470 may output N-best list data, altered from the cross-recognizer N-best list data 1460, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 1470 that are each specific to one or more different skill systems 125, domains, etc.

The NLU component 260 may include a ranker component 1490 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 1490 may assign the first NLU hypothesis a higher score than a second NLU hypothesis including at least one slot that is unfilled/unresolved by the entity resolution component 1470.

The ranker component 1490 may apply re-scoring, biasing, or other techniques. To do so, the ranker component 1490 may consider not only the data output by the entity resolution component 1470, but may also consider other data 1491. The other data 1491 may include a variety of information including information specific to a context of the received audio data, such as a device type or capabilities of the receiving device 110, an identity of the user as determined by the user recognition component 295, and/or information related to the skills or skill support systems 125.

For example, the other data 1491 may include skill system 125 rating or popularity data. For example, if a skill system 125 has a high rating, the ranker component 1490 may increase the score of a NLU hypothesis associated with that skill system 125, and vice versa.

The other data 1491 may additionally or alternatively include information about skill systems 125 that have been enabled by the user that originated the natural language input. For example, the ranker component 1490 may assign higher scores to NLU hypotheses associated with enabled skill systems 125 than NLU hypotheses associated with skill systems 125 that have not been enabled by the user.

The other data 1491 may additionally or alternatively include data indicating system usage history (e.g., specific to the user), such as if the user, that originated the natural language input, regularly invokes a particular skill system 125 or does so at particular times of day. The other data 1491 may additionally or alternatively include data indicating date, time, location, weather, type of device 110, user identifier, context, as well as other information. For example, the ranker component 1490 may consider when any particular skill system 125 is currently active with respect to the present user and/or device 110 (e.g., music being output by the skill system 125, a game being executed by the skill system 125, etc.).

The ranker component 1490 may output NLU results data 685 including one or more NLU hypotheses. The NLU component 260 may send the NLU results data 685 to the orchestrator component 230.

As described above, the system 120 may perform speech processing using two different components (e.g., the ASR component 250 and the NLU component 260). One skilled in the art will appreciate that the system 120, in at least some embodiments, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs NLU hypothesis data including a most likely NLU hypothesis, or multiple NLU hypotheses in the form of a lattice or an N-best list with individual NLU hypotheses corresponding to confidence scores or other scores (such as probability scores, etc.).

The device 110 and/or the system(s) 120 may include a user recognition component 295 that recognizes one or more users using a variety of data. As illustrated in FIG. 14, the user recognition component 295 may include one or more subcomponents including a vision component 1508, an audio component 1510, a biometric component 1512, a radio frequency (RF) component 1514, a machine learning (ML) component 1516, and a recognition confidence component 1518. In some instances, the user recognition component 295 may monitor data and determinations from one or more subcomponents to determine an identity of one or more users associated with data input to the device 110 and/or the system(s) 120. The user recognition component 295 may output user recognition data 1595, which may include a user identifier associated with a user the user recognition component 295 determines originated data input to the device 110 and/or the system(s) 120. The user recognition data 1595 may be used to inform processes performed by various components of the device 110 and/or the system(s) 120. For example, user recognition data 1595 may be used to select one or more user-specific entity models 1040 corresponding to a possible speaker of the input audio data during ASR. The user-specific entity models 1040 may include names from a contact list, names of nearby businesses or businesses frequented by the user, idiomatic expressions used by the user, and/or words and/or phrases in one or more languages other than the primary language typically used with the device 110, etc.

The vision component 1508 may receive data from one or more sensors capable of providing images (e.g., cameras) or sensors indicating motion (e.g., motion sensors). The vision component 1508 can perform facial recognition or image analysis to determine an identity of a user and to associate that identity with a user profile associated with the user. In some instances, when a user is facing a camera, the vision component 1508 may perform facial recognition and identify the user with a high degree of confidence. In other instances, the vision component 1508 may have a low degree of confidence of an identity of a user, and the user recognition component 295 may utilize determinations from additional components to determine an identity of a user. The vision component 1508 can be used in conjunction with other components to determine an identity of a user. For example, the user recognition component 295 may use data from the vision component 1508 with data from the audio component 1510 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1512. For example, the biometric component 1512 may receive data corresponding to fingerprints, iris or retina scans, thermal scans, weights of users, a size of a user, pressure (e.g., within floor sensors), etc., and may determine a biometric profile corresponding to a user. The biometric component 1512 may distinguish between a user and sound from a television, for example. Thus, the biometric component 1512 may incorporate biometric information into a confidence level for determining an identity of a user. Biometric information output by the biometric component 1512 can be associated with specific user profile data such that the biometric information uniquely identifies a user profile of a user.

The radio frequency (RF) component 1514 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1514 the strength of the signal (e.g., as a received signal strength indication (RSSI)). The RF component 1514 may use the RSSI to determine an identity of a user (with an associated confidence level). In some instances, the RF component 1514 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1516 may track the behavior of various users as a factor in determining a confidence level of the identity of the user. By way of example, a user may adhere to a regular schedule such that the user is at a first location during the day (e.g., at work or at school). In this example, the ML component 1516 would factor in past behavior and/or trends in determining the identity of the user that provided input to the device 110 and/or the system(s) 120. Thus, the ML component 1516 may use historical data and/or usage patterns over time to increase or decrease a confidence level of an identity of a user.

In at least some instances, the recognition confidence component 1518 receives determinations from the various components 1508, 1510, 1512, 1514, and 1516, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1595.

The audio component 1510 may receive data from one or more sensors capable of providing an audio signal (e.g., one or more microphones) to facilitate recognition of a user. The audio component 1510 may perform audio recognition on an audio signal to determine an identity of the user and associated user identifier. In some instances, aspects of device 110 and/or the system(s) 120 may be configured at a computing device (e.g., a local server). Thus, in some instances, the audio component 1510 operating on a computing device may analyze all sound to facilitate recognition of a user. In some instances, the audio component 1510 may perform voice recognition to determine an identity of a user.

The audio component 1510 may also perform user identification based on audio data 211 input into the device 110 and/or the system(s) 120 for speech processing. The audio component 1510 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1510 may perform user recognition by comparing speech characteristics represented in the audio data 211 to stored speech characteristics of users (e.g., stored voice profiles associated with the device 110 that captured the spoken user input).

FIG. 15 illustrates user recognition processing as may be performed by the user recognition component 295. The ASR component 250 performs ASR processing on ASR feature vector data 1650. ASR confidence data 1607 may be passed to the user recognition component 295. User recognition data 1595 may be passed back to the ASR component 250 to aid user-specific ASR; for example, through the use of user-specific entity models 1040.

The user recognition component 295 performs user recognition using various data including the user recognition feature vector data 1640, feature vectors 1605 representing voice profiles of users of the system 100, the ASR confidence data 1607, and other data 1609. The user recognition component 295 may output the user recognition data 1595, which reflects a certain confidence that the user input was spoken by one or more particular users. The user recognition data 1595 may include one or more user identifiers (e.g., corresponding to one or more voice profiles). Each user identifier in the user recognition data 1595 may be associated with a respective confidence value, representing a likelihood that the user input corresponds to the user identifier. A confidence value may be a numeric or binned value.

The feature vector(s) 1605 input to the user recognition component 295 may correspond to one or more voice profiles. The user recognition component 295 may use the feature vector(s) 1605 to compare against the user recognition feature vector 1640, representing the present user input, to determine whether the user recognition feature vector 1640 corresponds to one or more of the feature vectors 1605 of the voice profiles. Each feature vector 1605 may be the same size as the user recognition feature vector 1640.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1640 produced from the audio data 211. The user recognition component 295 may send a signal to voice profile storage 1685, with the signal requesting only audio data and/or feature vectors 1605 (depending on whether audio data and/or corresponding feature vectors are stored) associated with the device identifier, the group profile identifier, and/or the user identifiers represented in the metadata. This limits the universe of possible feature vectors 1605 the user recognition component 295 considers at runtime and thus decreases the amount of time to perform user recognition processing by decreasing the amount of feature vectors 1605 needed to be processed. Alternatively, the user recognition component 295 may access all (or some other subset of) the audio data and/or feature vectors 1605 available to the user recognition component 295. However, accessing all audio data and/or feature vectors 1605 will likely increase the amount of time needed to perform user recognition processing based on the magnitude of audio data and/or feature vectors 1605 to be processed.

If the user recognition component 295 receives audio data from the voice profile storage 1685, the user recognition component 295 may generate one or more feature vectors 1605 corresponding to the received audio data.

The user recognition component 295 may attempt to identify the user that spoke the speech represented in the audio data 211 by comparing the user recognition feature vector 1640 to the feature vector(s) 1605. The user recognition component 295 may include a scoring component 1622 that determines respective scores indicating whether the user input (represented by the user recognition feature vector 1640) was spoken by one or more particular users (represented by the feature vector(s) 1605). The user recognition component 295 may also include a confidence component 1624 that determines an overall accuracy of user recognition processing (such as those of the scoring component 1622) and/or an individual confidence value with respect to each user potentially identified by the scoring component 1622. The output from the scoring component 1622 may include a different confidence value for each received feature vector 1605. For example, the output may include a first confidence value for a first feature vector 1605a (representing a first voice profile), a second confidence value for a second feature vector 1605b (representing a second voice profile), etc. Although illustrated as two separate components, the scoring component 1622 and the confidence component 1624 may be combined into a single component or may be separated into more than two components.

The scoring component 1622 and the confidence component 1624 may implement one or more trained machine learning models (such as neural networks, classifiers, etc.) as known in the art. For example, the scoring component 1622 may use probabilistic linear discriminant analysis (PLDA) techniques. PLDA scoring determines how likely it is that the user recognition feature vector 1640 corresponds to a particular feature vector 1605. The PLDA scoring may generate a confidence value for each feature vector 1605 considered and may output a list of confidence values associated with respective user identifiers. The scoring component 1622 may also use other techniques, such as GMMs, generative Bayesian models, or the like, to determine confidence values.

The confidence component 1624 may input various data including information about the ASR confidence 1607, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 1624 may also consider the confidence values and associated identifiers output by the scoring component 1622. For example, the confidence component 1624 may determine that a lower ASR confidence 1607, or poor audio quality, or other factors, may result in a lower confidence of the user recognition component 295. Whereas a higher ASR confidence 1607, or better audio quality, or other factors, may result in a higher confidence of the user recognition component 295. Precise determination of the confidence may depend on configuration and training of the confidence component 1624 and the model(s) implemented thereby. The confidence component 1624 may operate using a number of different machine learning models/techniques such as GMM, neural networks, etc. For example, the confidence component 1624 may be a classifier configured to map a score output by the scoring component 1622 to a confidence value.

The user recognition component 295 may output user recognition data 1595 specific to a one or more user identifiers. For example, the user recognition component 295 may output user recognition data 1595 with respect to each received feature vector 1605. The user recognition data 1595 may include numeric confidence values (e.g., 0.0-1.0, 0-1000, or whatever scale the system is configured to operate). Thus, the user recognition data 1595 may output an n-best list of potential users with numeric confidence values (e.g., user identifier 123-0.2, user identifier 234-0.8). Alternatively or in addition, the user recognition data 1595 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123-low, user identifier 234-high). Combined binned and numeric confidence value outputs are also possible. Rather than a list of identifiers and their respective confidence values, the user recognition data 1595 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 1624 may determine the overall confidence value.

The confidence component 1624 may determine differences between individual confidence values when determining the user recognition data 1595. For example, if a difference between a first confidence value and a second confidence value is large, and the first confidence value is above a threshold confidence value, then the user recognition component 295 is able to recognize a first user (associated with the feature vector 1605 associated with the first confidence value) as the user that spoke the user input with a higher confidence than if the difference between the confidence values were smaller.

The user recognition component 295 may perform thresholding to avoid incorrect user recognition data 1595 being output. For example, the user recognition component 295 may compare a confidence value output by the confidence component 1624 to a threshold confidence value. If the confidence value does not satisfy (e.g., does not meet or exceed) the threshold confidence value, the user recognition component 295 may not output user recognition data 1595, or may only include in that data 1595 an indicator that a user that spoke the user input could not be recognized. Further, the user recognition component 295 may not output user recognition data 1595 until enough user recognition feature vector data 1640 is accumulated and processed to verify a user above a threshold confidence value. Thus, the user recognition component 295 may wait until a sufficient threshold quantity of audio data of the user input has been processed before outputting user recognition data 1595. The quantity of received audio data may also be considered by the confidence component 1624.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1605, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 1609 to inform user recognition processing. A trained model(s) or other component of the user recognition component 295 may be trained to take other data 1609 as an input feature when performing user recognition processing. Other data 1609 may include a variety of data types depending on system configuration and may be made available from other sensors, devices, or storage. The other data 1609 may include a time of day at which the audio data 211 was generated by the device 110 or received from the device 110, a day of a week in which the audio data audio data 211 was generated by the device 110 or received from the device 110, etc.

The other data 1609 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 1640 and one or more feature vectors 1605 to perform more accurate user recognition processing.

The other data 1609 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1609 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 1609 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1609 may include data representing activity of a particular user that may be useful in performing user recognition processing. For example, a user may have recently entered a code to disable a home security alarm. A device 110, represented in a group profile associated with the home, may have generated the audio data 211. The other data 1609 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1609 and considered by the user recognition component 295.

Depending on system configuration, the other data 1609 may be configured to be included in the user recognition feature vector data 1640 so that all the data relating to the user input to be processed by the scoring component 1622 may be included in a single feature vector. Alternatively, the other data 1609 may be reflected in one or more different data structures to be processed by the scoring component 1622.

Figure 16:
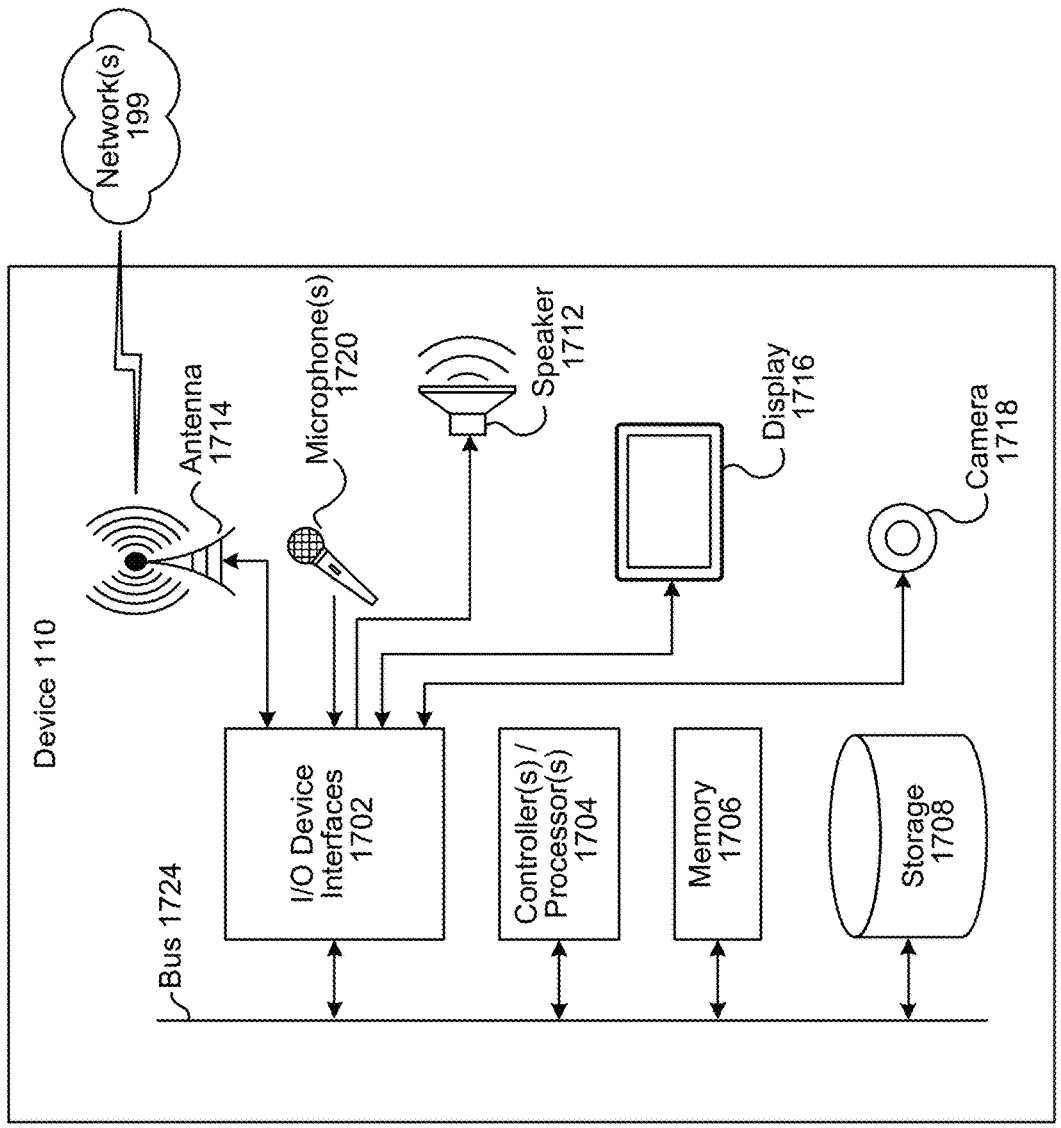
FIG. 16 is a block diagram conceptually illustrating example components of a device, according to embodiments of the present disclosure.
Figure 17:
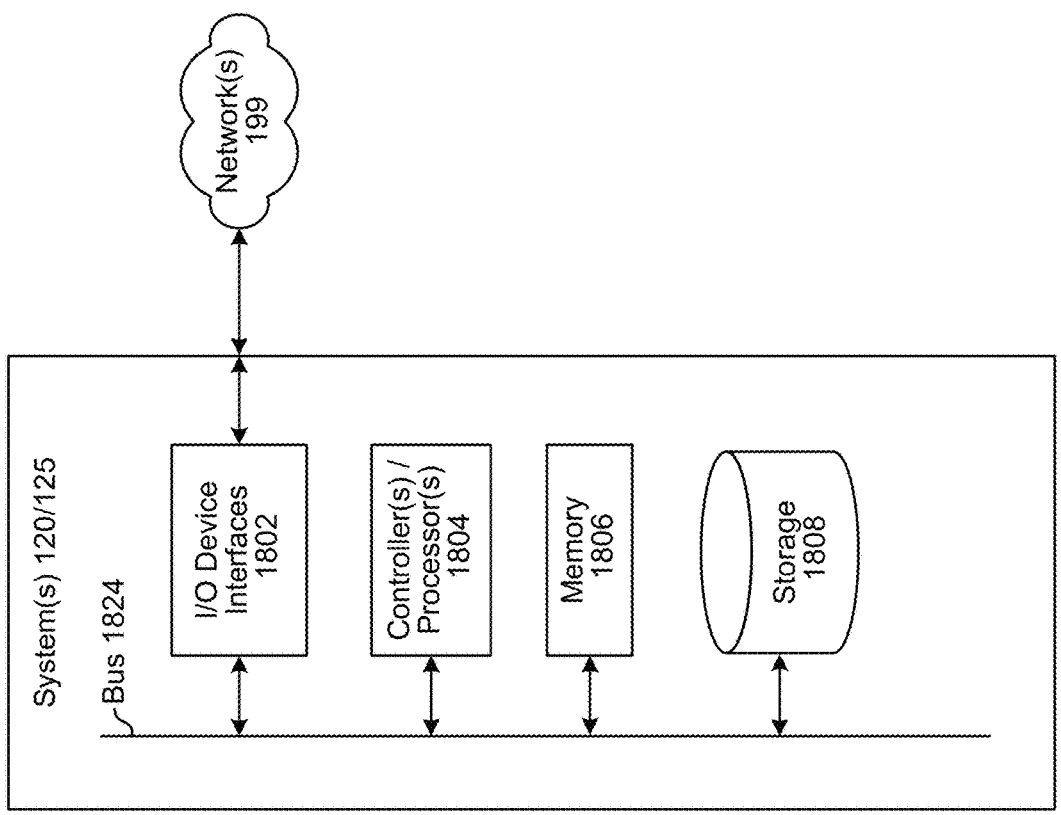
FIG. 17 is a block diagram conceptually illustrating example components of a system, according to embodiments of the present disclosure.

FIG. 16 is a block diagram conceptually illustrating a device 110 that may be used with the system. FIG. 17 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/120/125) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1702/1802).

Computer instructions for operating each device (110/120/125) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/120/125) includes input/output device interfaces (1702/1802). A variety of components may be connected through the input/output device interfaces (1702/1802), as will be discussed further below. Additionally, each device (110/120/125) may include an address/data bus (1724/1824) for conveying data among components of the respective device. Each component within a device (110/120/125) may also be directly connected to other components in addition to (or instead of) being connected to other components across the bus (1724/1824).

Referring to FIG. 16, the device 110 may include input/output device interfaces 1702 that connect to a variety of components such as an audio output component such as a speaker 1712, a wired headset or a wireless headset (not illustrated), or other component capable of outputting audio. The device 110 may also include an audio capture component. The audio capture component may be, for example, a microphone 1720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1716 for displaying content. The device 110 may further include a camera 1718.

Via antenna(s) 1714, the input/output device interfaces 1702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1702/1802) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1702/1802), processor(s) (1704/1804), memory (1706/1806), and/or storage (1708/1808) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 18:
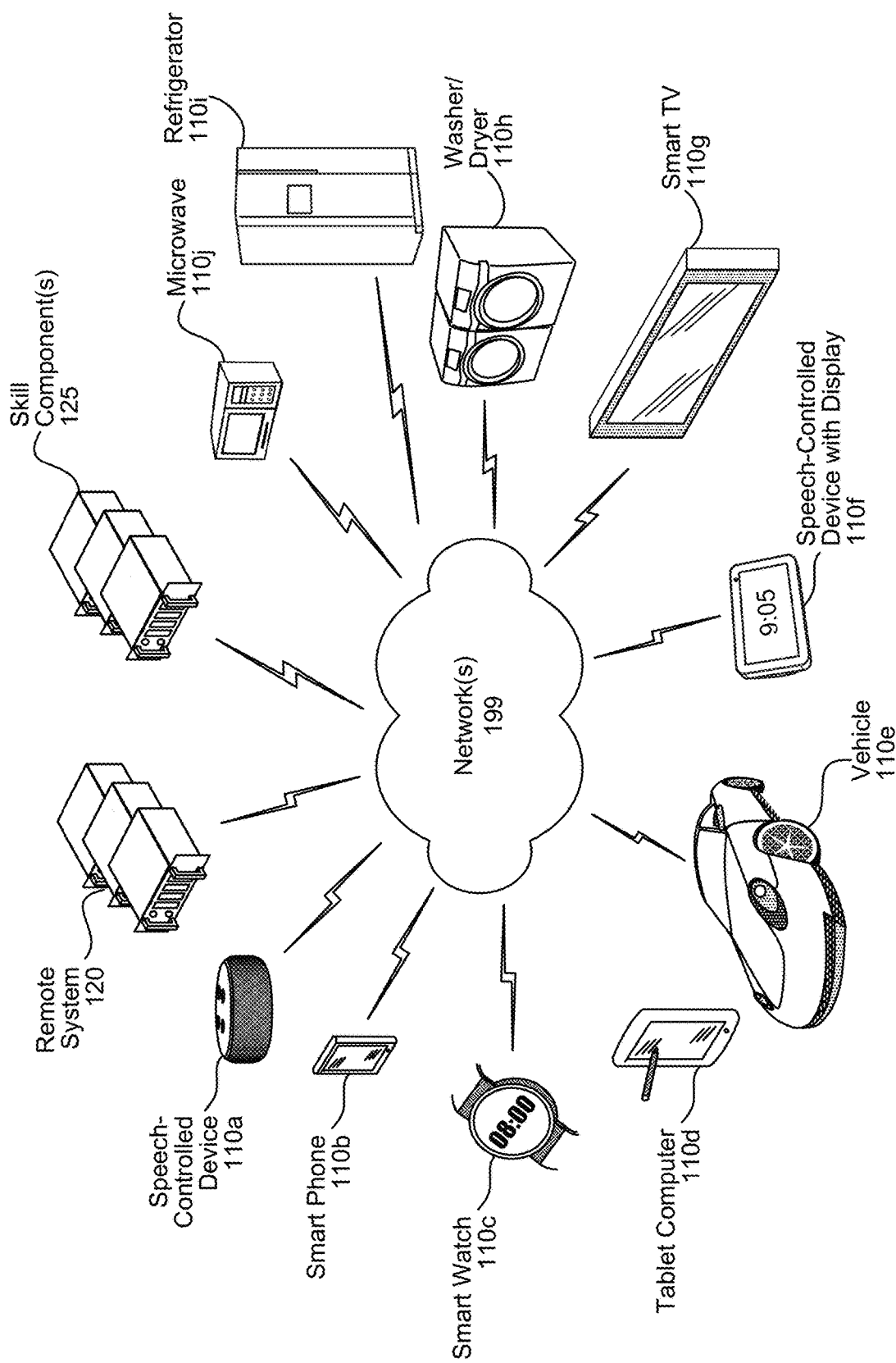
FIG. 18 illustrates an example of a computer network for use with the overall system, according to embodiments of the present disclosure.

As illustrated in FIG. 18, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for performing automatic speech recognition, the computer-implemented method comprising:
receiving input audio data corresponding to an utterance;
processing the input audio data using an acoustic model to generate acoustic data representing a sequence of phonemes, the acoustic data including at least a first portion and a second portion adjacent to and following the first portion;
processing the first portion using a default language model to generate first automatic speech recognition (ASR) result data, the first ASR result data including a first word potentially corresponding to the first portion;
processing the first word using the default language model to determine second ASR result data including a second word potentially corresponding to the second portion;
processing at least the first word using a context encoder to determine encoded context vector representing a context corresponding to the input audio data;
determining, based at least in part on the encoded context vector, that the second portion potentially relates to a specific language model representing an entity class, the specific language model being different than the default language model;
processing the first word using the specific language model to generate third ASR result data including a third word potentially corresponding to the second portion; and
based on the determining that the second portion potentially relates to the specific language model, outputting ASR output data including the first word and the third word.

2. The computer-implemented method of claim 1, wherein:
determining the encoded context vector includes using a first long short-term memory (LSTM) network to generate the encoded context vector;
the method further comprises processing, with a second LSTM network, the encoded context vector and a second vector corresponding to the specific language model to determine a first probability, the second vector including trained values for determining when to activate the specific language model; and
determining that the second portion relates to the specific language model includes determining that the first probability satisfies a condition.

3. The computer-implemented method of claim 1, further comprising:
processing a fourth word using the specific language model to determine fourth ASR result data including an end indicator representing an end of a word sequence and a first probability associated with the end indicator; and
based at least on the fourth ASR result data, outputting second ASR output data without including fifth ASR result data determined by the specific language model following the fourth ASR result data.

4. The computer-implemented method of claim 1, wherein:
determining, based at least in part on the input audio data, user recognition data indicating a possible user of the input audio data;
determining, based at least in part on the first word, that the second portion potentially relates to a named individual;
based on the user recognition data and the determining that the second portion potentially relates to a named individual, identifying a second specific language model representing a list of individuals in a contact list associated with a user; and
processing the first word using the second specific language model to generate fourth ASR result data.

5. A computer-implemented method comprising:
  receiving input audio data corresponding to an utterance, the input audio data including a first portion and a second portion;
  processing the input audio data using a first language model to generate first automatic speech recognition (ASR) result data including a first word corresponding to the first portion and a second word corresponding to the second portion;
  processing at least the first word using an encoder to determine encoded context data representing a context corresponding to the input audio data;
  determining, based at least in part on the encoded context data, that the second portion potentially relates to a second language model different from the first language model;
  processing the first word using the second language model to generate second ASR result data including a third word corresponding to the second portion; and
  based on determining that the second portion potentially relates to the second language model, outputting ASR output data including the first ASR result data and the second ASR result data.

6. The computer-implemented method of claim 5, further comprising:
  processing the encoded context data and first model data associated with the second language model to determine a first probability; and
  determining, based on the first probability meeting a first condition, that the second portion relates to the second language model.

7. The computer-implemented method of claim 6, wherein:
  determining the encoded context data includes processing the first word with a first LSTM network to generate a first fixed-length vector,
  the first model data is a second fixed-length vector, and
  determining the first probability includes processing the encoded context data and the first model data using a second LSTM network.

8. The computer-implemented method of claim 5, wherein the first ASR result data includes a first probability associated with the second word and the second ASR result data includes a second probability associated with the third word, the method further comprising:
  processing the first word using the first language model to determine third ASR result data including a first probability;
  determining, based at least on the first probability, the second probability, and the encoded context data, that the third word more likely represents the second portion than the second word; and
  based on determining that the third word more likely represents the second portion than the second word, outputting ASR output data including the first word and the third word but not the second word.

9. The computer-implemented method of claim 5, further comprising:
  processing a third portion of the input audio data using the second language model to determine third ASR result data including an indicator representing an end of a word sequence; and
  based at least on the third ASR result data, outputting second ASR output data without including fourth ASR result data determined by the second language model following the third ASR result data.

10. The computer-implemented method of claim 5, wherein:
  the first language model is a general language model,
  the second language model is a specific language model corresponding to a catalog of entities associated with an entity class, and
  determining that the second portion potentially relates to the second language model includes determining that the second portion potentially includes an entity belonging to the entity class.

11. The computer-implemented method of claim 5, further comprising:
  determining, based at least in part on the input audio data, user recognition data indicating a possible user of the input audio data;
  determining, based at least in part on the first word, that the second portion potentially relates to a named individual;
  identifying, based on the user recognition data and the determining that the second portion potentially relates to a named individual, a third language model representing a list of individuals in a contact list associated with a user; and
  processing the first word using the third language model to generate third ASR result data.

12. The computer-implemented method of claim 5, further comprising:
  determining a user profile associated with the input audio data; and
  determining that the user profile is associated with the second language model, wherein determining that the second portion potentially relates to the second language model is based additionally on the user profile being associated with the second language model.

13. A system, comprising:
  at least one processor; and
  at least one memory comprising instructions that, when executed by the at least one processor, cause the system to:
    receive input audio data corresponding to an utterance, the input audio data including a first portion and a second portion;
    process the input audio data using a first language model to generate first automatic speech recognition (ASR) result data including a first word corresponding to the first portion and a second word corresponding to the second portion;
    process at least the first word using an encoder to determine encoded context data representing a context corresponding to the input audio data;
    determine, based at least in part on the encoded context data, that the second portion potentially relates to a second language model different from the first language model;
    process the first word using the second language model to generate second ASR result data including a third word corresponding to the second portion; and
    based on determining that the second portion potentially relates to the second language model, output ASR output data including the first ASR result data and the second ASR result data.

14. The system of claim 13, the at least one memory further comprises instructions that, when executed by the at least one processor, further cause the system to:
  process the encoded context data and first model data associated with the second language model to determine a first probability; and determine, based on the first probability meeting a first condition, that the second portion relates to the second language model by determining that the first probability meets a first condition.

15. The system of claim 14, the at least one memory further comprises instructions that, when executed by the at least one processor, further cause the system to:
    determine the encoded context data by processing the first word with a first LSTM network to generate a first fixed-length vector, wherein the first model data is a second fixed-length vector; and
    determine the first probability by processing the encoded context data and the first model data using a second LSTM network.

16. The system of claim 13, wherein the first ASR result data includes a first probability associated with the second word and the second ASR result data includes a second probability associated with the third word, and the at least one memory further comprises instructions that, when executed by the at least one processor, further cause the system to:
    process the first word using the first language model to determine third ASR result data including a first probability;
    determine, based at least on the first probability, the second probability, and the encoded context data, that the third word more likely represents the second portion than the second word; and
    based on determining that the third word more likely represents the second portion than the second word, output ASR output data including the first word and the third word but not the second word.

17. The system of claim 13, wherein the at least one memory further comprises instructions that, when executed by the at least one processor, further cause the system to:
    process a third portion of the input audio data using the second language model to determine third ASR result data including an indicator representing an end of a word sequence; and
    based at least on the third ASR result data, output second ASR output data without including fourth ASR result data determined by the second language model following the third ASR result data.

18. The system of claim 13, wherein:
    the first language model is a general language model,
    the second language model is a specific language model corresponding to a catalog of entities associated with an entity class, and
    determining that the second portion potentially relates to the second language model includes determining that the second portion potentially includes an entity belonging to the entity class.

19. The system of claim 13, wherein the at least one memory further comprises instructions that, when executed by the at least one processor, further cause the system to:
    determine, based at least in part on the input audio data, user recognition data indicating a possible user of the input audio data;
    determine, based at least in part on the first word, that the second portion potentially relates to a named individual;
    identify, based on the user recognition data and the determining that the second portion potentially relates to a named individual, a third language model representing a list of individuals in a contact list associated with a user; and
    process the first word using the third language model to generate third ASR result data.

20. The system of claim 13, wherein the at least one memory further comprises instructions that, when executed by the at least one processor, further cause the system to:
    determine a user profile associated with the input audio data; and
    determine that the user profile is associated with the second language model, wherein determining that the second portion potentially relates to the second language model is based additionally on the user profile being associated with the second language model.

* * * * *